US008686356B2

(12) United States Patent
Whitehouse et al.

(10) Patent No.: US 8,686,356 B2
(45) **Date of Patent: *Apr. 1, 2014**

(54) FRAGMENTATION METHODS FOR MASS SPECTROMETRY

(71) Applicant: PerkinElmer Health Sciences, Inc., Waltham, MA (US)

(72) Inventors: Craig M. Whitehouse, Branford, CT (US); David G. Welkie, Trumbull, CT (US); Gholamreza Javahery, Waltham, MA (US); Lisa Cousins, Waltham, MA (US); Sergey Rakov, Waltham, MA (US)

(73) Assignee: PerkinElmer Health Sciences, Inc., Waltham, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/714,089

(22) Filed: Dec. 13, 2012

(65) Prior Publication Data

US 2013/0221233 A1 Aug. 29, 2013

Related U.S. Application Data

(63) Continuation of application No. 11/435,034, filed on May 16, 2006, now Pat. No. 8,334,507, which is a continuation of application No. 11/184,387, filed on Jul. 19, 2005, now Pat. No. 7,049,584, which is a continuation of application No. 10/448,477, filed on May 30, 2003, now Pat. No. 6,919,562.

(60) Provisional application No. 60/385,113, filed on May 31, 2002.

(51) Int. Cl.

| | |
|---|---|
| ***H01J 49/42*** | (2006.01) |
| ***H01J 49/26*** | (2006.01) |
| ***B01D 59/44*** | (2006.01) |

(52) U.S. Cl.
USPC ........... 250/292; 250/293; 250/290; 250/288; 250/281; 250/282

(58) Field of Classification Search
USPC .................. 250/292, 293, 290, 288, 281, 282
See application file for complete search history.

(56) References Cited

U.S. PATENT DOCUMENTS

| | | | |
|---|---|---|---|
| 4,731,533 | A | 3/1988 | Vestal |
| 4,933,551 | A | 6/1990 | Bernius et al. |

(Continued)

FOREIGN PATENT DOCUMENTS

| | | |
|---|---|---|
| DE | 100 58 706 | 2/2002 |
| WO | WO 02/078048 | 10/2002 |

OTHER PUBLICATIONS

"2.3.2 Ionisation Procedures" [online], Hübschmann, Hans-Joachim, "Handbook of GC/MS", 2001 [retrieved on Jun. 22, 2012], p. 140, 2 Basics, Retrieved from the Internet http://books.google.com/books?id=8 uhf4IPYzAIC&pg=PA140&dq=gc+ms+electron+ionization+energies&hl=en&sa=X&ei=-HfjT5ivF4Y0QGnssDwAw&ved=0CD4Q6AEwAA#v=onepage&q&f=true.

(Continued)

*Primary Examiner* — Nikita Wells
(74) *Attorney, Agent, or Firm* — Fish & Richardson P.C.

(57) ABSTRACT

Apparatus and methods are provided that enable the interaction of low energy electrons and positrons with sample ions to facilitate electron capture dissociation (EGO) and positron capture dissociation (PGO), respectively, within multipole ion guide structures. The apparatus and methods described herein allow EGO (and PCO) to be performed within multipole ion guides, either alone, or in combination with conventional ion fragmentation methods.

20 Claims, 18 Drawing Sheets

(56) References Cited

U.S. PATENT DOCUMENTS

| | | | | |
|---|---|---|---|---|
| 4,963,736 | A | 10/1990 | Douglas et al. | |
| 4,988,869 | A | 1/1991 | Aberth | |
| 5,670,378 | A | 9/1997 | Man et al. | |
| 5,756,996 | A | 5/1998 | Bier et al. | |
| 6,011,259 | A | 1/2000 | Whitehouse et al. | |
| 6,608,303 | B2 | 8/2003 | Amy et al. | |
| 6,800,851 | B1 | 10/2004 | Zubarev et al. | |
| 6,858,840 | B2 | 2/2005 | Berkout et al. | |
| 6,911,651 | B2 | 6/2005 | Senko et al. | |
| 6,919,562 | B1 * | 7/2005 | Whitehouse et al. | 250/288 |
| 6,995,366 | B2 | 2/2006 | Franzen | |
| 7,049,584 | B1 * | 5/2006 | Whitehouse et al. | 250/288 |
| 7,612,335 | B2 * | 11/2009 | Makarov et al. | 250/282 |
| 8,334,507 | B1 * | 12/2012 | Whitehouse et al. | 250/292 |

OTHER PUBLICATIONS

"Chromatography Online: Introduction to Electron Impact Ionization for GC-MS" [online], Apr. 1, 2012 [retrieved on Jun. 22, 2012]. Retrieved from the Internet http://license.icopyright.net/user/viewFreeUse.act?fuid=MTYzMzk0MjE%3D.

"Electron Impact Ionization" [online], A. Tyler © , Jan. 26, 2000 [retrieved on Jun. 22, 2012]. Retrieved from the Internet http://www.chem.harvard.edu/mass/tutorials.ei.html.

European Office Action dated Oct. 20, 2009 for Application No. 03756376.4, 4 pages.

Fenn et al., "Electrospray Ionization for Mass Spectrometry of Large Biomolecules," Science, 246:64-71, 1989.

Hakansson et al., "High-Sensitivity Electron Capture Dissociation Tandem FTICR Mass Spectrometry of Microelectrosprayed Peptides," Anal. Chem., 73:3605-3610, 2001.

Horn et al., "Activated Ion Electron Capture Dissociation for Mass Spectral Sequencing of Larger (42 kDa) Proteins," Anal. Chem., 72:4778-4784, 2000.

McLafferty et al., "Biomolecule Mass Spectrometry," Science, 284:1289-1290, 1999.

McLuckey et al., "Gas-phase Ionization of Polyatomic Molecules via Interactions with Positrons," Rapid Commun. Mass Spectrom. 10:269-276, 1996.

Olsen et al., "Comparison of electron capture dissociation and collisionally activated dissociation of polycations of peptide nucleic acids," Rapid Commun. Mass Spectrom., 15:969-974, 2001.

Supplementary European Search Report dated Jan. 27, 2009 for Application No. 03756376.4, 2pages.

Zubarev et al., "Electron Capture Dissociation of Multiply Charged Protein Cations. A Nonergodic Process," J. Am. Chem. Soc. 120:3265-3266, 1998.

* cited by examiner

FRAGMENTATION METHODS FOR MASS SPECTROMETRY

RELATED APPLICATIONS

This patent application is a continuation of U.S. Ser. No. 11/435,034, filed May 16, 2006, which is a continuation of U.S. Ser. No. 11/184,387, filed Jul. 19, 2005, now U.S. Pat. No. 7,049,584, which is a continuation of U.S. Ser. No. 10/448,477, filed May 30, 2003, now U.S. Pat. No. 6,919,562, which itself incorporates prior provisional patent application 60/385,113, filed May 31, 2002. The disclosures of the prior applications are considered part of (and are incorporated by reference in) the disclosure of this application.

FIELD OF INVENTION

This invention relates to the field of mass spectrometry, and specifically to the application of electron-capture dissociation (ECD) or positron-capture dissociation (PCD) within multipole ion guides of mass spectrometers to facilitate the identification and structure of chemical species.

BACKGROUND OF THE INVENTION

Mass spectrometers are powerful tools for solving important analytical and biological problems. For example, mass spectrometers can be used to determine the molecular weight of an ion by measurement of its mass-to-charge (m/z) ratio, while its structure may be elucidated by dissociation methods and subsequent analysis of fragmentation patterns.

The most common useful ion sources for large molecules are atmospheric pressure chemical ionization (APOCI), matrix-assisted laser desorption ionization (MALDI) and electrospray ionization (ESI) sources. In contrast to other types of ion sources, such as electron ionization or inductively-coupled plasma sources, the ionization processes used in MALDI and ESI sources may be characterized as gentle, in that molecules become charged without inducing fragmentation, thereby preserving the identity of the sample molecules. Such gentle ionization can be efficiently achieved with MALDI and ESI even for relatively large biomolecules such as proteins, peptides, DNA, RNA, and the like. This capability is in large part responsible for the important role that MALDI and ESI, coupled to mass spectrometers, have come to assume in the advancement of research and development in biotechnology fields.

In general, MALDI generates primarily singly charged ions ($z=1$), while ESI efficiently produces primarily multiple-charged ions ($z>1$) (Fenn, et al, Science 246, 64 (1989)). These different charge-state distributions lead to different advantages and disadvantages of the two ionization methods. For example, the analysis of mixtures of components is often more straightforward with MALDI due to the presence of only single-charge states, versus the more complicated multiple-charge-state distributions produced by ESI. On the other hand, specific structural information can be very difficult to obtain with MALDI for relatively large molecules (e.g., with mass>20,000 Da), because fragmentation methods commonly used to elucidate structure tend to be relatively inefficient for ions with large m/z values. Detailed information on the structure of a molecule is often at least as analytically useful, if not more so, than knowledge of the mass of the molecule.

However, even a very large molecule may be analyzed in conventional mass spectrometers if the molecule can be ionized with multiple charges. For example, if a protein of molecular weight 30,000 Da acquires 10 charges, its m/z value is reduced to 3,000, which is readily measurable with essentially all commonly used mass spectrometers. The multiple-charge ionization of large molecules is one prominent capability of the ESI process, which has resulted in rapid growth of the popularity of ESI sources for the creation of multiple-charge ions of a variety of biomolecules, including small organic molecules, peptides, proteins, and other molecular complexes such as DNA derivatives. Mass spectrometer types that have been configured with ESI sources include Fourier transform ion-cyclotron resonance (FTICR), magnetic-sector, 2-dimensional and 3-dimensional quadrupole ion-traps, quadrupole mass filters, and hybrid instruments consisting of various combinations of these types, as well as others.

An important application of ESI combined with mass spectrometry is the structural identification of peptides, proteins, and other biomolecules with amino-acid residues. Structural analysis is often performed with a so-called tandem mass spectrometer using a technique referred to as MS/MS analysis. Essentially, a precursor ion of interest is m/z-selected in a first stage of a tandem mass spectrometer, and the selected ion is then fragmented in a second stage to produce product ions. These product ions are then m/z-analyzed in a third stage, resulting in a product-ion mass spectrum that represents a fragmentation pattern of the selected precursor ion. Such tandem instruments may be configured so that the separate stages are either sequential in space, such as multiple quadrupole mass filters arranged co-axially in series, or sequential in time, as with a single three-dimensional ion trap.

Deductions about the molecular structure of the precursor ion may then be made from an analysis of the fragmentation pattern observed in the product-ion spectrum. For example, the sequence structure of a protein may be (at least partly) determined from the measured m/z values of the various detected fragment ions, by deducing the sequence of amino acid residues that would have had to exist in the protein precursor ion to produce the observed fragment ions. The ideal situation in this case would be the cleavage of the amine backbone bonds on either side of each amino acid residue in a protein or peptide chain.

The success of this approach depends fundamentally on the extent to which dissociation occurs at such strategically advantageous locations in the structure of the precursor ion. Whether dissociation occurs by cleavage of any particular chemical bond in a precursor ion depends on many factors, including: the nature of the chemical bond; the amount of energy absorbed by the precursor ion; the modes available in the precursor ion to dissipate energy; and the mechanism by which energy is deposited. The various mechanisms by which energy may be deposited in an ion have given rise to a variety of fragmentation methods, such as collisionally activated dissociation (CAD), in which energy is deposited in a precursor ion as a result of collisions with a target gas; and, infrared multi-photon dissociation (IRMPD) which involves absorption of infrared photons by the precursor ions.

While distinctly different in approach, both CAD and IRMPD depend ultimately on the excitation of vibrational and rotational states within the precursor ion to cleave chemical bonds, and so the fragmentation patterns resulting from either method naturally tend to be dominated by excitation of the lowest-energy vibrational and/or rotational states. Consequently, cleavage at some bond sites of a particular precursor ion is typically preferred over others within any particular ion. Given that only a limited amount of energy is available for ‘activation’ of an ion, and that some energy may be dissipated by exciting vibrational or rotational modes without bond cleavage, a limitation of CAD and IRMPD is that the probability for dissociation of a precursor ion by cleavage at many of its bond sites may be insignificant relative to that of other, more energetically-favored, sites. For example, for peptides, cleavage readily occurs at the N-terminal side of a proline residue or the C-terminal side of an aspartic acid, while cleavage seldom occurs at di-sulfide bonds. The net result is that the structural information provided by fragment ion spectra is often insufficient to deduce a complete residue sequence.

For small peptide precursor ions, i.e., those consisting of typically less than 10-15 amino acid residues, the dissipation of energy within an ion without bond cleavage can be relatively inefficient due to the limited number of bonds. In this case, bond cleavage may occur with sufficient probability for most, if not all, of the strategically important cleavage sites, resulting in a relatively comprehensive sequence analysis. In general, though, proteins, peptides, peptide nucleic acids (PNAs), and other biomolecules can be substantially larger than such small peptides, and, in fact, can frequently contain hundreds of amino acid residues. Owing to the much greater ability of such large ions to absorb and dissipate vibrational and rotational energy, significant cleavage with the CAD or IRMPD methods often occur only for the most energetically favored cleavage sites, resulting in relatively sparse fragmentation spectra. Consequently, the CAD or IRMPD approaches alone frequently do not provide sufficient sequence information for a complete structural analysis to be performed on many molecules.

An alternative approach to CAD or IRMPD was reported recently by Zubarev et al., in J. Am. Chem. Soc. 120, 3265 (1998), where they teach that multiple-charged ions dissociate differently upon capture of low-energy electrons than they do with CAD. In this process, called electron-capture dissociation (ECD), low-energy electrons combine with low-energy, multiple-protonated molecules in the gas phase. Unlike CAD and IRMPD, the energy for fragmentation is derived from electronic state interactions rather than by vibrational and/or rotational state excitations. Subsequent to the capture of a low-energy electron, a multiple-charged ion is believed to undergo a structural rearrangement, leading to structural instability and, ultimately, fragmentation. These processes are proposed to be sufficiently fast that competing processes, such as energy redistribution, are less likely to occur than with CAD or IRMPD, resulting in bond cleavage that is less dependent on bond strength than with CAD or IRMPD. Consequently, the fragmentation patterns generated by ECD exhibit a larger variety of different cleavage patterns than those generated by CAD or IRMPD.

The advantages of ECD, either alone, or in combination with CAD, have been amply demonstrated. For example, ECD has been found to cleave peptide backbone amine bonds, (Cα-N bonds), which cleave infrequently with CAD, and results in much greater peptide sequence coverage than with CAD. Additionally di-sulfide bonds of larger proteins readily and selectively fragment, unlike CAD. Consequently, for example, McLafferty et al., in Science 284, 1289 (1999), report that, for the 76-residue ubiquitin (8.6 kDa), data from one CAD and two ECD spectra provided complete sequence information. Olsen et al., in Rapid Commun. Mass Spectrom., 15, 969 (2001), report that the combination of CAD and ECD yields similarly powerful complementary data for sequencing peptide nucleic acids (PNAs). Horn et al., in Anal. Chem. 72, 4778 (2000) also teach that the combination of CAD and ECD, whereby ions are subjected to ECD while colliding with background gas, increases the efficiency of cleavage at least 3-fold for a smaller protein (17 kDa) and extends the usefulness of ECD to much larger proteins (>40 kDa). Therefore, it is evident from these and other reports that ECD often yields nearly complete sequence mapping of small proteins (<20 kDa) and, at the least, has been demonstrated to be a powerful complement to conventional CAD methods, even for larger ions.

Thus far, however, the success of the ECD technique has only been reported in conjunction with FTICR mass spectrometers. In an ICR cell, precursor ions are stored under the influence of magnetic and electric fields; the ions oscillate at cyclotron frequencies corresponding to their m/z values, and the Fourier transform of the repetitive signal that such m/z-dependent oscillations produce results in the measured m/z spectrum. Although the incorporation of ECD fragmentation into FTICR instruments has been relatively successful, it has not been without challenges. The first requirement for reasonable fragmentation efficiency by ECD is the production of a large flux of low-energy electrons in the energy range of <0.2 to about 5 eV. The significance of this requirement was demonstrated recently by Hakansson et al., in Anal. Chem., 73, 3605 (2001), who reported two to three orders of magnitude increase in sensitivity by optimizing the design and operation of their electron source, and subsequently by Tysbin et al., in Rapid Commun. Mass Spectrom. 15, 1849 (2001) who demonstrated the potential for rapid analysis enabled by the use of relative large indirectly heated dispenser type cathodes in the electron source.

Apart from the production of a healthy flux of low-energy electrons, a second critical requirement is to be able to transport low-energy electrons into the mass spectrometer with good efficiency. A third critical requirement is to retain low-energy electrons in the volume occupied by precursor ions long enough to allow a significant number of interactions to take place between the precursor ions and the low-energy electrons. The successful incorporation of the ECD technique in FTICR instruments is directly related to the relative ease with which low-energy electrons can be readily transported and retained, along with precursor ions, due to the stability of the electrons' motion in the strong magnetic fields of the ICR cell.

FTICR instruments, however, are currently relatively expensive, and require specialized skill to operate and maintain. Therefore, it would be of substantial benefit to incorporate the ECD fragmentation technique into more economical, commonly-used types of mass spectrometers, such as triple quadrupole mass spectrometers, quadrupole-time-of-flight mass spectrometers, two-dimensional quadrupole ion traps, and other similar multipole ion guide-based mass spectrometers. Unfortunately, in contrast to ICR cells of FTICR instruments, multipole ion guide-based mass spectrometers typically utilize only DC and AC (RF) electric fields, that is, without magnetic fields. (For this reason, such multipole ion guides are sometimes referred herein as 'RE multipole ion guides', which is to be understood to encompass ion guides that employ both DC and RF voltages, as well as RF-only voltages). Generally, the stability of motion of a charged particle in such electric fields extends only over a limited range of particle m/z values. However, the m/z value of an electron is typically a factor of at least five orders of magnitude less than ions with even the lowest m/z value of interest. Therefore, low-energy electrons and precursor ions are hardly likely to be stable simultaneously within the fields of an RF multipole ion guide, in contrast to the situation in an FTICR instrument.

In addition, electrospray ionization readily produces negative ions as well as protonated positive molecules, and most mass spectrometers have the capacity to routinely analyze and detect both positive and negative ions. The ECD method of fragmentation is not useful for negative ions, since the Coulomb repulsion of same-polarity charge would preclude the close-range interaction of electrons and negative ions. Nevertheless, a fragmentation method similar to ECD would prove to be just as useful for structure analysis of negative ions as ECD appears to be for positive ions. In fact, it is expected that the capture of positrons (electron anti-particles) by negative ions follows a mechanism similar to electron capture in reaction with positive ions. In analogy to ECD, the fragmentation of ions due to capture of positrons may be referred to as 'positron capture dissociation', or PCD. Positrons are stable but relatively short-lived due to their strong reaction with matter. However, McLuckey et al., in Rapid Commun. Mass Spectrom. 10, 269 (1996), has reported that positron capture by organic molecules can occur, and, at positron energy less than about 3 eV, extensive fragmentation of organic molecules was observed. They also noted that the fragmentation efficiency increased as the positron energy decreased, similar to trends observed with ECD fragmentation of positive ions, which seems to suggest that similar mechanisms leading to fragmentation are involved. The apparatus incorporated a Penning trap where close interaction between positrons and organic molecules was achieved in the presence of a 1 T magnetic field over the length of the trap. As with ECD, the incorporation of PCD into RF multipole ion guide-based mass spectrometers would be of substantial benefit for ion structure determination by MS/MS analysis, in particular, of negative ions.

Despite the clear desirability of performing ECD and PCD within RF multipole ion guide-based mass spectrometers, the means by which this may be accomplished has not previously been available.

SUMMARY OF THE INVENTION

Accordingly, it is one object of the present invention to provide apparatus and methods that enable the fragmentation of ions by the processes of ECD (for positive ions) and PCD (for negative ions) within RF multipole ion guide structures.

It is another object of the present invention to provide apparatus and methods that enable the fragmentation of ions within RF multipole ion guide structures by the processes of ECD and PCD, simultaneous with, or alternately with, other conventional fragmentation methods, such as CAD, within the same RF multipole ion guide structure.

It is still another object of the present invention to provide apparatus and methods that enable fragmentation of ions by ECD and PCD within a multiple RF multipole ion guide configuration, wherein ECD and PCD take place in regions between adjacent multipole ion guides.

It is still another object of the present invention to provide apparatus and methods that enable fragmentation of ions by ECD and PCD within a multiple RF multipole ion guide configuration, wherein ECD and PCD takes place in regions between adjacent ion guides, while other fragmentation methods, such as CAD, can be performed, either simultaneously, or alternately, within one or more RF ion guides of the multiple RF multipole ion guide configuration.

In most conventional mass spectrometers based on RF multipole ion guide configurations, selection of a precursor ion for fragmentation is most frequently performed with an RF quadrupole ion guide operated in the so-called RF/DC mass filter mode. The selected precursor ions are usually accelerated into a pressurized second multipole ion guide (typically an RF-only multipole collision cell), where they fragment due to collisions with target gas molecules.

The collision cell multipole can be a quadrupole, hexapole, octapole, etc. essentially coaxial with the upstream m/z-resolving quadrupole. Typically the rods are mounted in an enclosure in order to establish the desired target gas pressure within the collision cell, while maintaining a low pressure in surrounding regions. Two electrodes with apertures are positioned in the entrance and the exit of the collision cell to restrict outflow of gas while allowing ions to pass in and out of the cell.

A third m/z analyzer then measures the m/z spectrum of the resulting fragment, or product, ions. When this third m/z analyzer is another RF/DC mass filter, the overall configuration just described is referred to as a 'triple-quadrupole' configuration. Alternatively, the third m/z analyzer may be a time-of-flight mass spectrometer (TOF-MS), in which case, the overall configuration is referred to as a 'QqTOF' configuration. Other types of m/z analyzers may be used for m/z selection of precursor and product ions, as well.

Clearly, the ECD technique is best incorporated into such multiple ion guide arrangements in the vicinity of the collision cell, that is, after the precursor ions have been selected for dissociation, and before the m/z analyzer that will measure the fragment ions. The challenges that need to be surmounted in order to achieve effective and efficient ECD in a multipole ion guide include the same ones that were discussed above in conjunction with the implementation of ECD in an FTICR instrument. Specifically, the first requirement is the production of a large flux of low-energy electrons in the energy range of <0.2 to about 5 eV. A second requirement is to be able to transport such low-energy electrons into the multipole ion guide, or otherwise, the region where ECD fragmentation is intended, with good efficiency. Alternatively, low-energy electrons may be produced in the intended vicinity of fragmentation. A third requirement is to retain low-energy electrons in the volume occupied by precursor ions long enough to allow a significant number of interactions to take place between the precursor ions and the low-energy electrons. Various aspects and embodiments of the present invention that specifically address each of these requirements will be described briefly below.

A pressurized RF multipole ion guide provides an attractive environment for efficient ECD because ions are forced to move with low velocity due to collisional cooling effects. Douglas, et al., in U.S. Pat. No. 4,963,736, teach that RF multipole ion guides operating at elevated pressures provide an effective means to achieve reduced ion kinetic energy. Ion collisions with the neutral background gas serve to reduce the radial and axial velocity components of the ion due to momentum changing collisions. As the ions lose most of their radial and axial energy due to such collisions in the presence of the RF field, they tend to coalesce near the axis of the collision cell. The reduction of ion velocity in a pressurized collision cell leads to an increase in low-energy electron capture efficiency. The electron capture efficiency is also increased due to the electrostatic potential well created near the collision cell axis by the space charge of the coalesced ion population. The space charge well creates an attractive potential for the slow electrons and serves to draw them toward the higher density ions.

The reaction efficiency can be further enhanced by electrostatic trapping in an RF multipole ion guide as taught by Whitehouse, et al., in U.S. Pat. No. 6,011,259, which is fully incorporated herein by reference. During electrostatic trapping, an axial field gradient is applied that reverses the ion velocity ions in the regions of the exit and entrance of an RF multipole ion guide. Reactions are most efficient when the ions and electrons have very low relative velocity, which can occur in the vicinity of velocity reversal of the ions in the repulsive electric fields.

It is also possible to enhance the low energy flux of electrons on the axis of the pressurized RF multipole ion guide by use of a magnetic field coaxial with the ion guide axis. Electrons precess around magnetic field lines, which acts to retains electrons that would otherwise have been lost. An appropriately-shaped magnetic field can be applied to enhance the density of electrons near the axis, while having a negligible effect on the very slow ions with little velocity in both the radial and axial direction.

Utilizing methods of electron reversal in electric fields can produce a high flux of low-energy electrons. Electrostatic focusing of the electron beam can be arranged such that electrons undergo velocity reversal in the RF multipole ion guide. At these points the electrons have near-zero energy. A preferred configuration permits overlap in space of the low velocity ions with the near-zero energy electrons. Methods that incorporate electron reversal for efficient low velocity electron/molecule reactions are described by Man, et al., in U.S. Pat. No. 5,670,378, and references therein.

There are numerous approaches to developing high fluxes of electrons, any of which are included within the scope of the present invention. One approach utilizes a heated filament and appropriate electron optics. Another approach, as demonstrated by Zubarev, utilizes an indirectly heated cathode dispenser. Dispenser cathodes are useful when low temperature, high current density electron emission is desired, and typically are constructed from doped porous tungsten metal with oxide coatings. Materials with wide band gaps, including but not limited to magnesium oxide, silicon carbide, aluminum oxide, and aluminum nitride, also are used for emission of electrons from surfaces. They exhibit the property of negative electron affinity (NEA), whereby the vacuum level of the material lies below the bottom of the conduction band. In this case no energy barrier prevents low-energy electrons from escaping into the vacuum. Lasers of appropriate wavelength can also be used to induce electron emission from surfaces.

Relatively fewer approaches are known that allow the production of positrons, but these, as well as others, are considered to be within the scope of the present invention. High intensity positron sources can be generated using an particle accelerator, by colliding a high energy electron beam (100 MeV) with a platinum or tungsten surface. When the electron beam impinges on the target, it decelerates and generates highly energetic photons. These photons interact with the electric field of the target nuclei and produces electron-positron pairs. Then normal optics are used to accelerate positrons and reject electrons. Low energy positron beams can be produced relatively inexpensively using radioactive substances such as $^{22}$Na. $^{22}$Na emits beta particles (with energy of 554 keV). A solution of $^{22}$NaCl is deposited on a thin layer of Kapton. The layer is encapsulated with tungsten, and reaction occurs that produces positrons in a range of energies from 0.2 eV to 100 eV.

Conventional fragmentation methods are also provided within the scope of the present invention, either simultaneously, or in series, with ECD, to achieve complete, or nearly complete, sequence coverage for structural characterization of large biomolecules. The present invention also includes a method to introduce slow positrons for effective positron capture.

The invention, as described below, includes a number of embodiments. Each embodiment comprises a source of electrons or positrons. The source of electrons includes, but is not limited to, appropriate electron transfer optics in combination with: a heated filament; an indirectly heated cathode dispenser; photosensitive materials in combination with a photon source; wide band-gap materials in combination with applied voltages; a commercially obtained electron gun; and any of the electron sources mentioned above. Each embodiment also contains at least one multipole ion guide, with or without electrostatic trapping. Each embodiment contains apparatus and methods for the production of low-energy electrons, the introduction of the low-energy electrons into a multipole RF ion guide configuration, and the sustained interaction of low-energy electrons or positrons with positive or negative ions, respectively. A two-dimensional multipole ion guide may be comprised of a set of 4 rods (quadrupole), 6 rods (hexapole), 8 rods (octapole) or greater numbers of rods arranged symmetrically about a common axis. In some cases it is preferable to fill the ion guide with background gas. In some cases it is preferable to use a quadrupole ion guide, for example, to yield a narrower beam of ions on axis, or as another example, to permit mass-to-charge selection. In cases where a wider beam near axis is beneficial, a higher order multipole may be used. In some cases it is preferable to trap the precursor ion in one or multiple collision cells by applying trapping potentials.

The embodiments of the invention can be interfaced to any kind of ion source, including atmospheric pressure ion (API) sources or low pressure sources. API sources include but are not limited to Electrospray (ESI), Matrix-Assisted Laser Desorption and Ionization (MALDI), Inductively Coupled Plasma (ICP) and Atmospheric Pressure Chemical Ionization (APCI) sources. Ion sources that operate in vacuum or partial vacuum include, but are not limited to, chemical Ionization (CI), Electron Ionization (EI), Fast Atom Bombardment (FAB), Flow FAB, Laser Desorption (LD), Matrix Assisted Laser Desorption Ionization (MALDI), Thermospray (TS) and Particle Beam (PB). The embodiments of the invention can be interfaced to continuous-flow single and triple quadrupole ion guides, two-dimensional ion traps, three dimensional ion traps, magnetic sector, FTICR, time-of-flight, and hybrid quadrupole-TOF mass analyzers, or to any combination of these.

The embodiments described herein utilize the phenomenon of radial and axial compression in a pressurized RF multipole collision cell. Ions that are introduced into an RF multipole collision cell experience a dramatic reduction in their velocity due to momentum changing collisions with the neutral background gas in the RF field. As the ions lose most of their radial and axial velocity in the presence of the RF field, they converge to the centerline of the collision cell. The spatial focus of the ions creates an attractive potential for slow electrons and serves to draw them toward the higher density ions.

The embodiments described below also utilize the advantages of trapping the ions in the collision cell. (Trapping is accomplished by providing repulsive barriers at the exit and entrance). Trapping is utilized for a number of reasons. First, the ions are given enough time to undergo a large number of collisions, which is required in order to focus them near the centerline of the axis of the RF multipole collision cell, where the RF field is zero. Any charged particle introduced in or very close to the zero field of the RF field has a stable trajectory, because they will not be influenced in any way by the field. Second, the electrons can be introduced into the RF multipole collision cell in such a way as to permit a focus along the centerline. The attractive forces of the ions that are localized near the centerline further draw in the electrons. Electrons that reside in close vicinity to the ions for a sufficient period of time undergo reaction. Third, electrostatic lenses can be arranged such that velocity reversal of both ions and electrons can be utilized in the trapping field, minimizing their relative velocity and enhancing the electron capture efficiency. Fourth, it is preferable to control the ion-electron encounter time. The electron flux may be low and it may be necessary to irradiate the ions with electrons for a period of time longer than a typical flight through a pressurized ion guide. Fifth, it is preferable to control the time after the ion-electron encounter. Although the reaction time for electron capture is fast, the ion may need time to rearrange prior to fragmentation. Thus the yield of fragments may depend on the excess time given to the fragmenting ion prior to exiting the collision cell. Finally, trapping the ions is helpful because it is sometimes preferable to pulse the focusing optics. For example, it is sometimes preferable to pulse the RF off temporarily to permit the electrons to enter an RF-free multipole collision cell. By first thermalizing the precursor ions to the center of the cell, more time is required for precursor ions and their fragments to respond to the pulsed field.

One embodiment of the present invention includes the pulsed injection of electrons onto the axis of a pressurized RF multipole collision cell. An electron source is positioned behind an RF multipole collision cell, between two lenses, and at an angle from the axis of the collision cell, typically near 90 degrees. The electrons are pulsed onto the centerline of the RF multipole ion guide, where the RF field is adjusted to be close to zero. The voltages on the lenses are adjusted in such a way as to cause the electron to undergo velocity reversal along the axis of the ion guide. This is accomplished by applying appropriate DC or pulsed voltages within the electron source, on the RF multipole electrodes, and on the entrance and exit lenses. Similarly the ions are trapped within the RF multipole collision cell, and undergo velocity reversal. Voltages are arranged to permit maximum overlap of the electron and ion density.

An alternative configuration includes positioning an electron source on axis, in the region behind the RF multipole collision cell, in a volume between two lenses, to enhance the number of electrons with velocity components that are coaxial with the RF multipole collision cell.

Another embodiment of the invention includes a weak magnetic field of several milliTesla, along the axis of an RF multipole collision cell. The magnetic field aids to compress the electron radial velocity, discouraging the electrons from escaping the centerline.

Yet another embodiment includes the pulsing the RF field off and on at regular intervals, to reduce electron scattering losses as the electrons are injected into the RF multipole collision cell.

Yet another embodiment includes a magnetic field aligned radially with respect to the axis of the RF multipole ion guide. Yet another embodiment includes adjustment of the RF balance on the multipole ion guide or collision cell.

Another embodiment of the invention comprises electron sources embedded within the RF multipole collision cell or three-dimension trap to further enhance the electron flux on axis.

Another embodiment of the invention comprises sequential collision cells and injection of electrons in an essentially field-free region between the exit of the first collision cell and the entrance of the second collision cell.

Another embodiment of the invention, further enhancing the flux of low-energy electrons, comprises the injection of an electron or positron beam in the elongated space between one A pole and one B pole of a quadrupole rod set. An alternative configuration of this embodiment comprises the injection of an electron or positron beam in the elongated space between one + pole and one − pole of a multipole rod set.

Another embodiment comprises collision cell rods with thin wires or meshed conducting materials, positioning an electron source behind the meshes.

Another embodiment utilizes a light source or a laser to induce electron emission from a photosensitive gas in the RF multipole collision cell. In one configuration a laser beam is used as a light source, and the laser beam is transmitted along the axis of the collision cell. In an alternative configuration the laser beam is transmitted orthogonal to the axis, through space between the electrodes. In these configurations, the laser beam can be passed through the cell in a multi-pass fashion to enhance the overlap of the electrons, generated by ionization, with the precursor ions.

Another embodiment comprises a light source or a laser to induce electron emission from a photosensitive surface in the RF multipole collision cell. A laser beam is aimed at the surface, preferably at an angle to permit multiple passes. In an alternative configuration, the surface is positioned behind the collision cell and the laser strikes the surface orthogonal to the axis of the RF multipole collision cell.

Another embodiment utilizes a fast ion beam source is used to eject electrons from a surface.

Another embodiment comprises the injection of an ion beam into the multipole volume and the simultaneous injection of an electron beam into the volume, at some angle between 0 and 90 degrees.

Another embodiment comprises an orthogonal ion source positioned behind the RF multipole collision cell, useful for ion-ion interactions. The ions are turned and directed inward, to the center of the collision cell.

Another embodiment comprises an orthogonal ion source positioned in between two RF multipole collision cells, useful for ion-ion interactions in a continuous flow device. The ions are produced and injected orthogonal to the axis, and undergo collision with the precursor ion beam in a cross-beam fashion.

The invention involves the utilization of a pressurized RF multipole ion guide. The pressure within the ion guide also impacts the yield of electron capture. The yield depends on the specific conditions employed, including but not limited to the precursor ion to be fragmented, the required electron flux, and whether CAD is desired to occur simultaneously. Therefore, in the inventions described below, the pressure can vary over the range such that the number of ion-neutral collisions varies from 1 to >50.

DETAILED DESCRIPTION OF THE INVENTION AND THE PREFERRED EMBODIMENTS

Figure 1A:
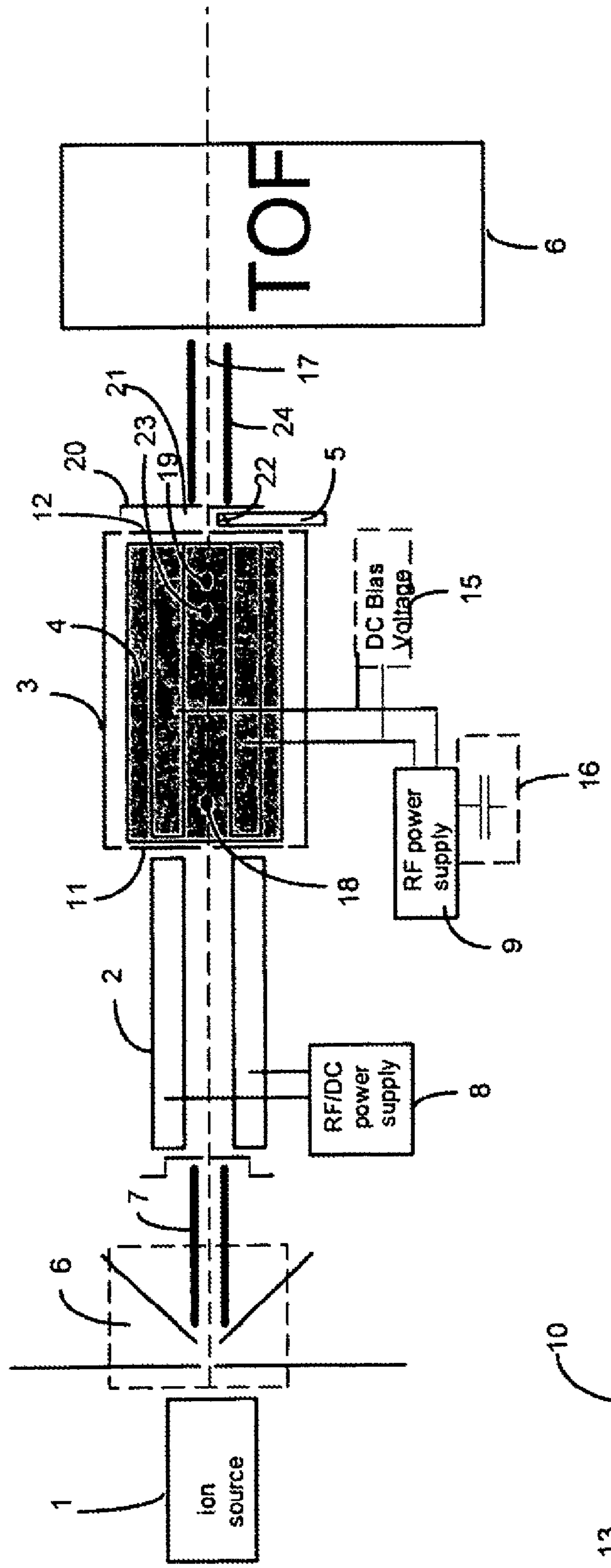
FIG. 1A illustrates an overview of a preferred embodiment, whereby a low-energy electron beam is produced orthogonal to the axis of a, RF multiple ion guide collision cell and injected inward.
Figure 1B:
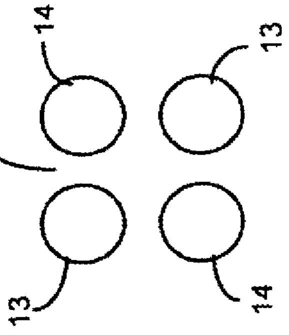
FIG. 1B illustrates the four rod structure of a RF quadrupole ion guide collision cell.

One embodiment of the present invention is illustrated in FIG. 1A. Ions are produced in atmospheric pressure ion (API) source 1, and are transported through: various vacuum stages 6 of decreasing pressure; RF multipole ion guide 7; RF/DC quadrupole mass filter 2; RF multipole collision cell 3 containing target gas 4; RF multipole ion guide 24; and TOF m/z analyzer 6. Mass filter 2 is driven by RF/DC power supply 8. A set of ions of one particular m/z is selected and transmitted into RF multipole collision cell 3, typically held at an elevated pressure with respect to mass filter 2. RF multipole collision cell 3 is powered by an RF power supply 9 that provides oscillating voltage to the pairs of electrodes. For example, RF multipole collision cell 3 may comprise a quadrupole rod set 10 containing four cylindrical electrodes with rounded surfaces, illustrated in FIG. 1B. Rod set 10 is electrically configured such that the electrodes positioned 180 degrees are electrically connected and form an electrode pair, for example electrodes 13 form a pair and electrodes 14 form a pair. The two electrode pairs have opposite RF polarity; for example, if negative voltage is applied to electrode pair 13, then a voltage equal in magnitude but positive in polarity is applied to electrode pair 14. A common DC bias voltage 15 defines the reference voltage for the RF waveforms applied to the rods. Capacitance device 16 is used to adjust the RF balance on the electrodes, to optimize the RF field. The DC potential on centerline 17 is determined by DC bias voltage 15. Ideally the RF field on centerline 17 is zero.

RF multipole collision cell 3 is equipped with lens 11 at the collision cell entrance and lens 12 at the collision cell exit. The voltage on lens 11 is adjusted to transfer ions from mass analyzer 2 into the collision cell 3. At time t=1, the voltage on lens 12 is set repulsive with respect to DC bias voltage 15 to prevent the ions from exiting RF multipole collision cell 3 through an orifice in lens 12. After a small fill time, most of the ions are nearly thermalized to the room temperature of the collision gas 4. The pressurized collision cell is held at a potential given by the DC bias voltage 15. The pressure of collision gas 4 is variable from 0.01 mTorr to 200 mTorr. At time t=2, lens 11 is set repulsive with respect to the DC bias voltage 15 such that ions can neither enter nor exit the RF multipole collision cell 3. The ions then traverse the length of the RF multipole collision cell 3 in a multi-pass fashion and compress to a volume along centerline 17 where the RF field is zero. A capacitance device 16 may be required to perfectly balance, or optimize, this field. The DC field on centerline 17 is repulsive to the ions near lens 11 and lens 12, yielding ion velocity reversal near points 18 and 19. The DC voltages applied to lens 11 and lens 12 determine the location of the points. Lens 20 is positioned behind lens 12, with gap 21 of sufficient width to contain electron source 5 yet still prevent ion losses during ion extraction into RF multipole ion guide 24. Gap 21 may be held at a lower pressure than that of RF multipole collision cell 3. Lens 20 is set to the same voltage as lens 12.

In one configuration, an electron source 5 of appropriate diameter is positioned orthogonal but close to the centerline 17. Casing 22 surrounds the electron source and is held at the same potential as lens 12 and lens 20. The electron source may be of a type that includes, but is not limited to: a heated filament; an indirectly heated cathode dispenser; photosensitive materials in combination with a photon source; a commercially obtained electron gun; and so on. Preferably the electron source is configured to optimize the flux of low-energy electrons directed toward the centerline 17.

Electrons emitted from the electron source enter the field free region defined by lens 12, lens 20 and enclosure 22. At some time t=3 the electrons are injected into the RF multipole collision cell 3 by pulsing the voltage on lens 20 to a value slightly more negative potential to that on lens 12. Electrons with appropriate velocity are pulsed near centerline 17 of RF multipole collision cell 3 and are focused on centerline 17 by the voltage combination of lens 12 and DC bias voltage 15 on RF multipole collision cell 3. The value of the voltage on lens 20 determines the extent to which the ions are accelerated into the field, and can be chosen such that, at some turning point 23, the field on axis 17 becomes repulsive to the electrons. In regions near this point the ECD yield is high. It is preferable to optimize turning point 23 such that it overlaps with points near turning points 18 or 19 of the ion beam. Lens 12 and lens 20 are constructed of mesh lenses or aperture lenses. Alternative lens arrangements can be employed in this region to optimize the flux of low-energy electrons in this region.

Lens 20 is pulsed at a high rate, typically 1-5 MHZ. The voltages on lens 20 and lens 12, and the DC bias voltage 15, may be varied in a repetitive fashion to permit overlap between the low energy electron beam and low energy ion beam at different points along centerline 17. In some cases it may be preferable to transmit a continuous beam of electrons onto centerline 17, for example if the physical dimensions of the electron source are very small such that the electrons are produced very close to centerline 17.

After some time t=4, reaction has taken place. Referring again to FIG. 1A, the voltage on lens 12, lens 20 and enclosure 22 are adjusted to release the ions from RF multipole collision cell 3, where they are focused into RF multipole ion guide 24 and mass analyzed by TOF-MS 5.

Figure 1C:
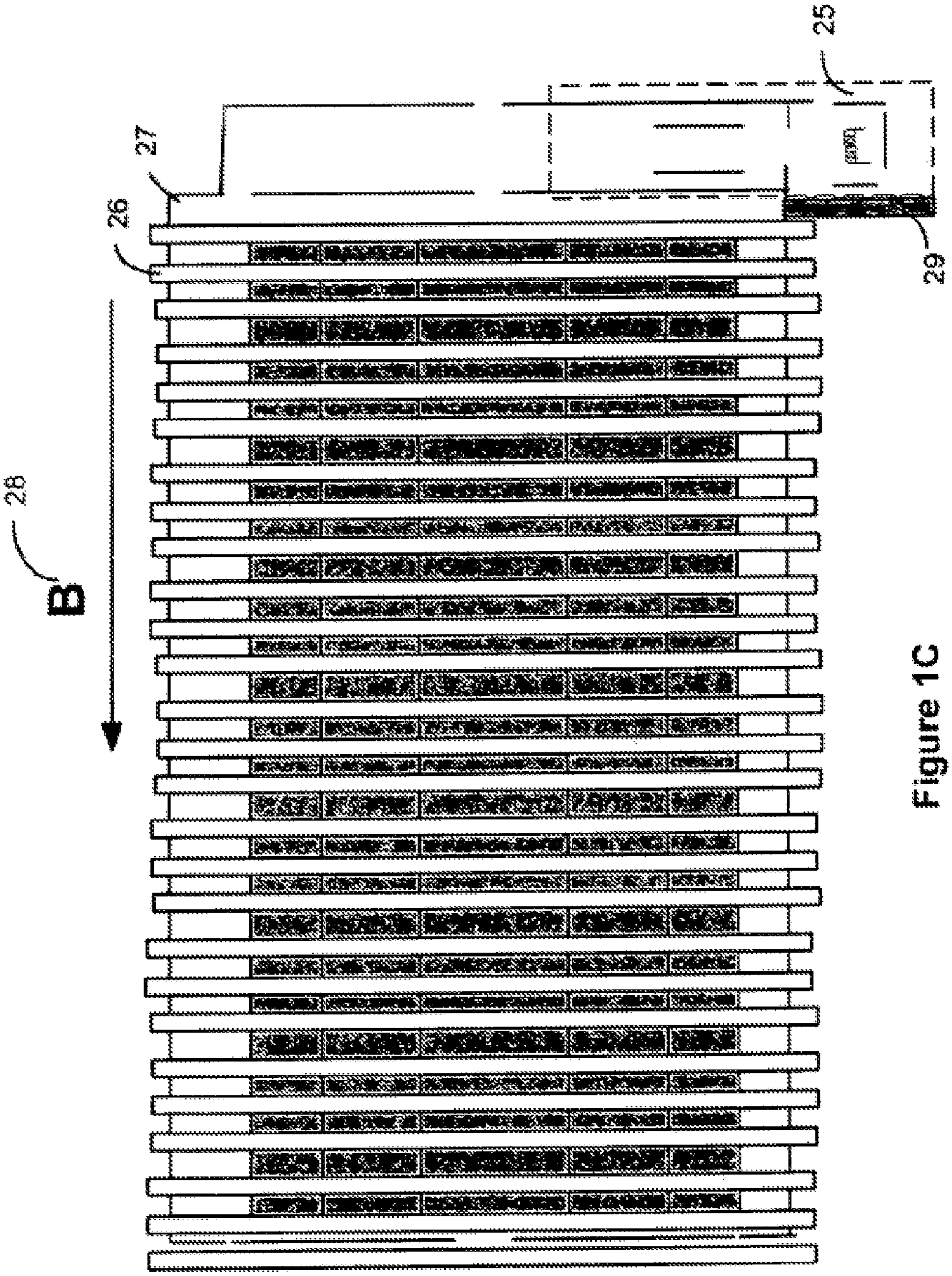
FIG. 1C illustrates a solenoid encompassing an RF multipole collision cell, providing an axial magnetic field.

Another configuration of a preferred embodiment is illustrated in FIG. 1C, and includes the addition of a magnetic field to enhance the axial capture of slow electrons. Electrons are introduced by means of electron source 25. Solenoid 26 of several thousand turns/m is wound around an RF multipole collision cell enclosure 27 producing magnetic field 28. The material of enclosure 27 is transparent to the magnetic field. A current of several amps is passed through the solenoid to generate magnetic field 28 on the order of 5-10 milliTesla. The magnetic field is directed parallel to centerline 17 of the RF multipole collision cell. The current applied depends on the radial dispersion of the electron beam. Electrons with velocity perpendicular to the magnetic field vector rotate about the magnetic field lines. Solenoid 26 is optimized to produce an electron orbit radius of less than 0.5 mm. Heat may be removed from the solenoid by use of a small portion of cooling gas into inlet 29. The ions are sufficiently slow that their orbit radius is very small, sub-micron, and are essentially not affected by the magnetic field.

Another mode of operating the preferred embodiment illustrated in FIG. 1A includes the ability to rapidly turn the RF voltage off during the injection of the electrons. This prevents possible repulsion from the axis of electrons with radial velocity components. For example, the RF voltage can be reduced to zero in a relatively short time (commercially available RF power supplied are available, e.g., from R.M. Jordan Co., that can reduce the RF voltage to essentially zero in ½ of an RF cycle). While the RF voltage is off, electrons may enter the collision cell and react with ions. The RF voltage may then be turned back on after several us, for a period of time permitting the fragments to thermalize and be focused on centerline 17. This sequence may be repeated for a number of cycles, after which the resulting fragment ions are release for mass analysis.

Another configuration of the preferred embodiment above includes magnetic field confinement in axial and radial directions. This configuration also includes the ability to inject electrons into RF multipole collision cell 3 prior to injecting the ions. The RF voltage on the RF multipole collision cell 3 is held off during the injection of electrons. During this time the electrons are compressed axially by the magnetic field in three dimensions. After a sufficient fill time of electrons, the ions are then injected into RF multipole collision cell 3 and the RF voltage is slowly ramped on to provide confinement for the precursor and fragment ions.

Figure 1D:
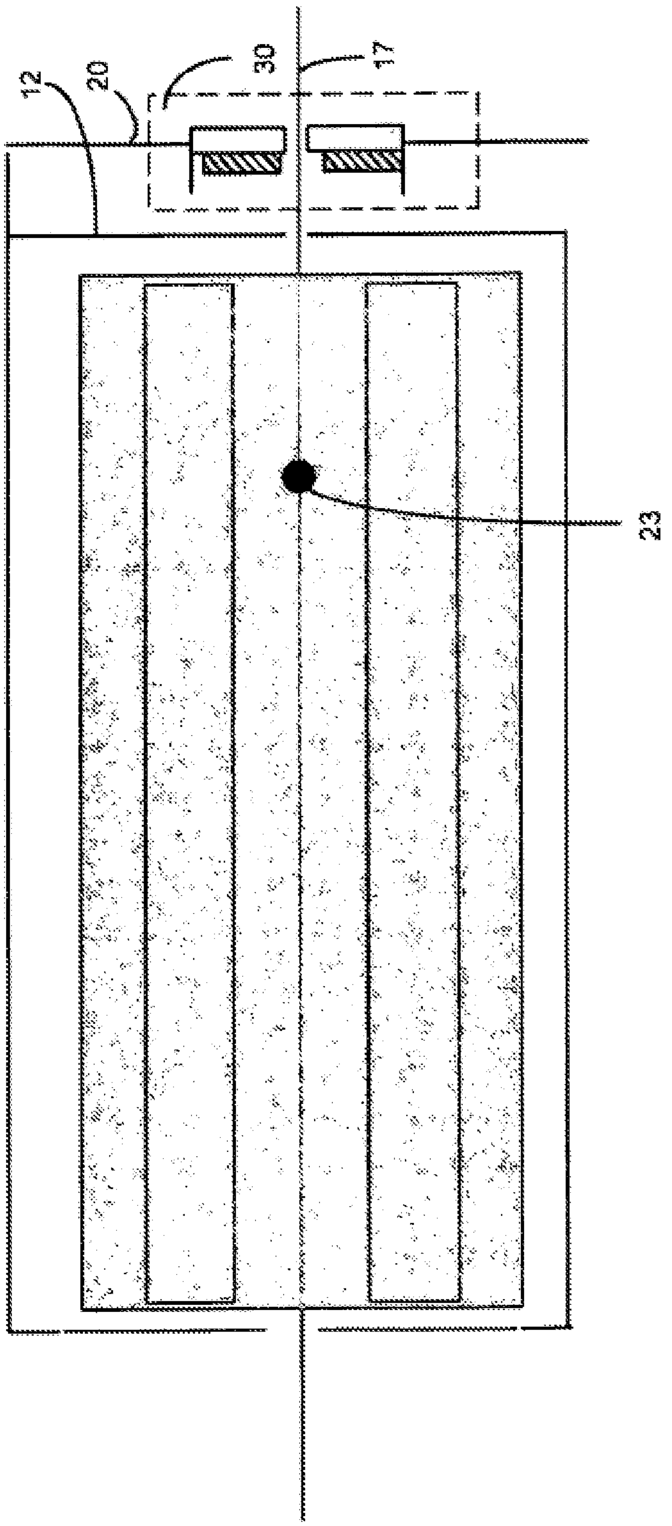
FIG. 1D illustrates a preferred embodiment, whereby a low-energy electron beam is produced behind but coaxial with a RF multiple ion guide collision cell and drawn inward.

FIG. 1D illustrates yet another configuration of the preferred embodiment above, whereby electron source 30 is positioned close to lens 20 behind lens 12. A spray of electrons is released from electron source 30 and voltages are arranged such that the electrons are focused on centerline 17 and undergo velocity reversal near turning point 23.

Figure 2:
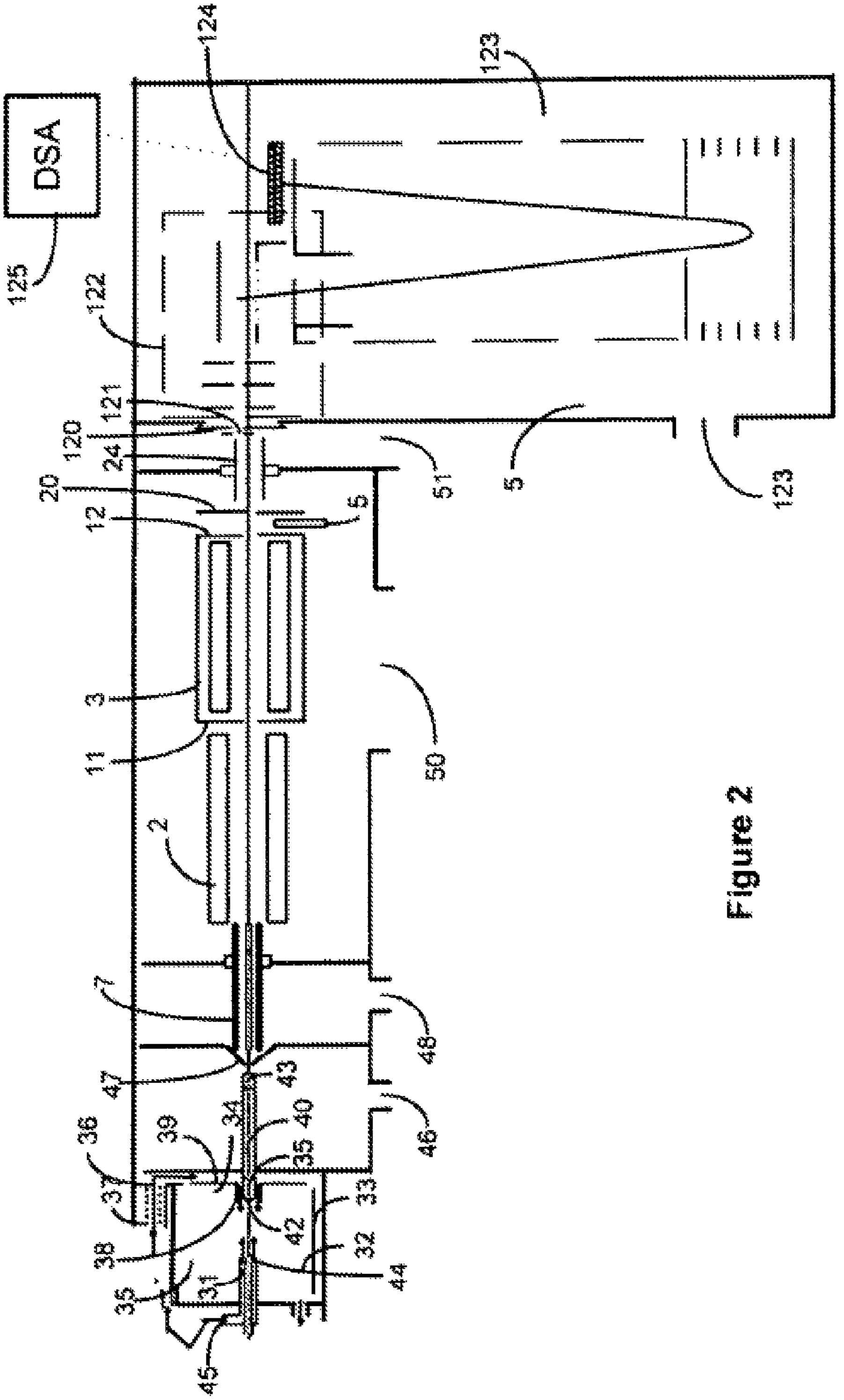
FIG. 2 illustrates in detail a preferred embodiment, comprising a tandem mass spectrometer equipped with an ESI source, a resolving quadrupole, a RF multipole collision cell designed for ECD and CAD, and a TOF mass spectrometer.

A detailed illustration of the preferred embodiment of FIG. 1 is illustrated in FIG. 2. Referring to FIG. 2, liquid sample is introduced into ES probe 31 using a liquid delivery system, for example a separation system such as liquid chromatography. The ES source 32 is operated by applying potentials to cylindrical electrode 33, endplate electrode 34 and capillary entrance electrode 35. Counter current drying gas 36 is directed to flow through heater 37 and into the ES source chamber through endplate nosepiece 38 opening 39. Bore 40 through dielectric capillary tube 41 comprises an entrance orifice 42 and exit orifice 43. Ions enter and exit the dielectric capillary tube with potential energy roughly equivalent to the entrance and exit electrode potentials respectively. To produce positive ions, negative kilovolt potentials are applied to cylindrical electrode 33, endplate electrode 34 with attached electrode nosepiece 38 and capillary entrance orifice 42. ES probe 31 remains at ground potential during operation. To produce negative ions, the polarity of electrodes 33, 34 and 38 are reversed with ES probe 34 remaining at ground potential.

With the appropriate potentials applied to elements in ES source 32, electrosprayed charged droplets are produced. The charged droplets exiting ES probe tip 44 are driven against the counter current drying gas 36 by the electric fields formed by the relative potentials applied to ES probe 31 and ES chamber electrodes 33, 34, and 38. A nebulization gas 45 can be applied through a second layer tube surrounding the sample introduction first layer tube to assist the formation of droplets. As the droplets evaporate, ions are formed and a portion of these ions are swept into vacuum through capillary bore 40. The droplets are entrained in neutral background gas that forms a supersonic jet, expanding into vacuum from capillary exit orifice 43. A portion of the ions entering first stage vacuum 46 is directed through the skimmer orifice 47 and into second vacuum stage 48. Ions are transported through RF multipole ion guide 7 into a third vacuum stage 50 and into resolving RF/DC quadrupole mass filter 2. In this configuration, a particular m/z value (or set of values) is selected from the ion beam, and ions of other m/z values are ejected. The selected ion is then transported into the pressurized RF multipole collision cell 3 where they are trapped by proper adjustment of lens 11 and lens 12. They are collisionally damped to centerline 17. Electron source 5 generates low-energy electrons that are injected along the axis of RF multipole 3 as discussed above. The ion undergoes electron capture reaction induced by the injection of low-energy electrons into RF multipole collision cell 3. The ion may also undergo conventional collisionally activated dissociation (CAD) such as axial acceleration CAD, whereby the ions are accelerated into a high pressure region, typically as they are transported through collision cell 3. This is achieved by applying acceleration potential between mass filter 2 and RF multipole collision cell 3. The ions may undergo conventional CAD followed by electron capture, or the ion may proceed without further fragmentation. Additional methods of fragmentation, including additional stages of fragmentation, such as resonant excitation as taught by Whitehouse, et. al. may also be accomplished in the RF multipole collision cell 3.

The resulting fragment and precursor ions are extracted from RF multipole collision cell 3 and are transported through RF multipole ion guide 24, which is positioned in two vacuum stages, 50 and 51, and serves as a conductance limiting tube separating stage 50 and 51. Pressure continually drops across its length. The ions may be trapped in RF multipole ion guide 24, and rapidly pulsed out, to improve duty cycle as taught by Whitehouse. Alternatively, other forms of CAD may be carried out in this region, for example resonant excitation CAD or even ECD. The ions are focused through lens 120 and orifice 121 into the TOF 5 and TOF pulsing region 122. The TOF is positioned in another vacuum region 123. The product ions are transported into the pulser region 122 and pulsed into the flight region 123, where they are separated in time and detected by microchannel plate 124. The resulting signal is sent to a digital signal averager 125 for amplification and analysis.

Figure 3:
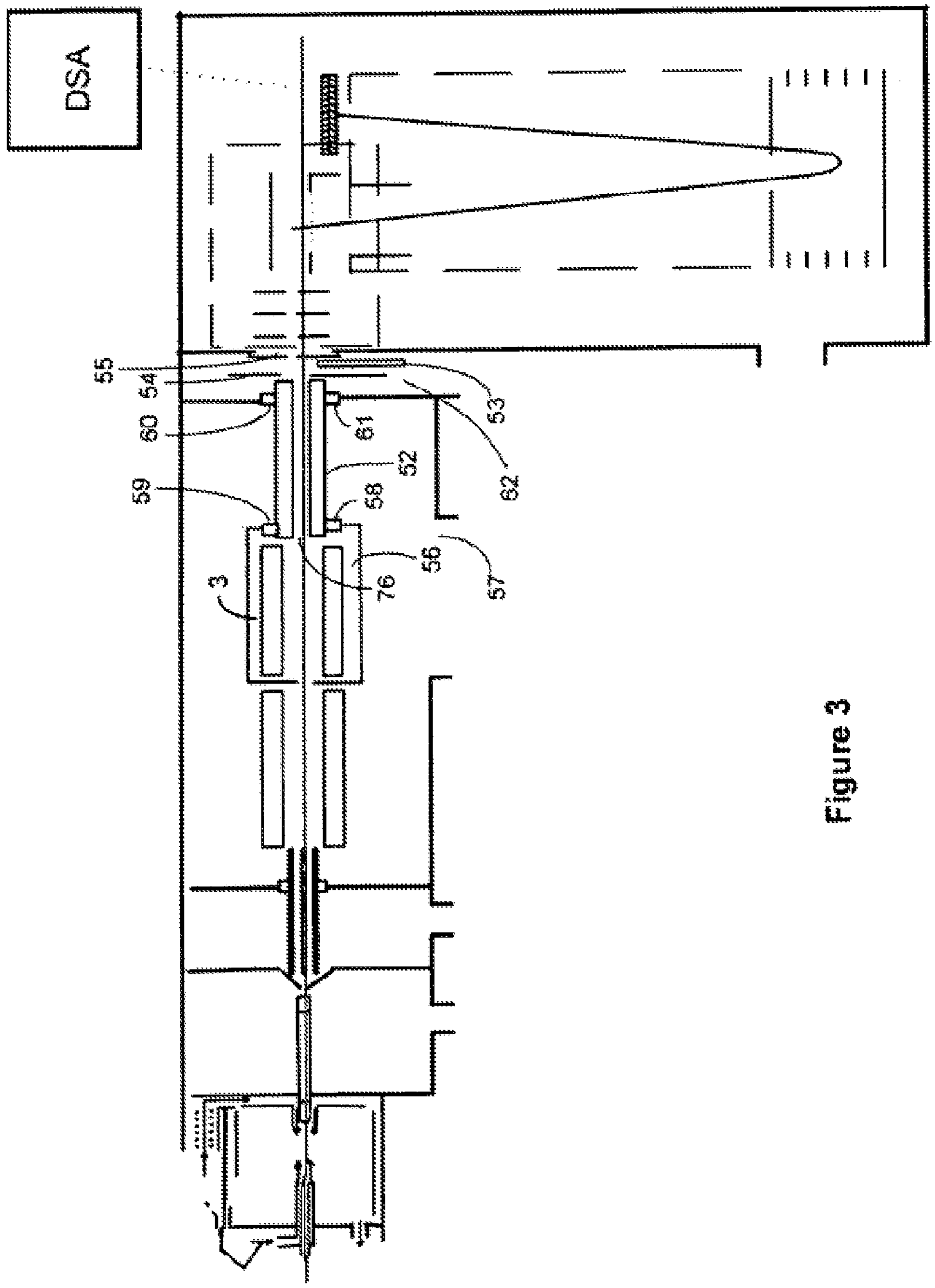
FIG. 3 illustrates an alternative configuration whereby ECD is performed in an RF multipole ion guide positioned directly behind the RF multipole collision cell.

Another preferred embodiment is illustrated in FIG. 3. This embodiment comprises injection of low-energy electrons into RF multipole ion guide 52, which is positioned behind RF multipole collision cell 3. RF multipole ion guide 52 is constructed of appropriate diameter and length to restrict the conductance between RF multipole collision cell 3 held at pressure 56, and the evacuated region 57. The junctions 58 and 59 are vacuum seals. Similarly, RF multipole ion guide 52 restricts flow from evacuated region 57 into evacuated region 62. The junctions 60 and 61 are vacuum seals. Low-energy electrons generated by source 53 are injected along the axis of RF multipole ion guide 52. Voltages are arranged on lenses 55, 54, and electron source 53, DC voltage bias on RF multipole ion guide 52, and DC voltage bias 15 on RF multipole collision cell 3 such that electron velocity reversal occurs near point 76. Near point 76, there are still a sufficient number of collisions to contain the fragment ions in RF multipole ion guide 52. Other electron source configurations as described above can be utilized, such as injection of electrons through the space between the rods on RF multipole ion guide 52. This embodiment has the advantage of producing thermalized precursor ions in RF multipole collision cell 3, and efficiently transporting them RF multipole ion guide 52 where low-energy electrons are injected in a lower pressure region 58.

Figure 4:
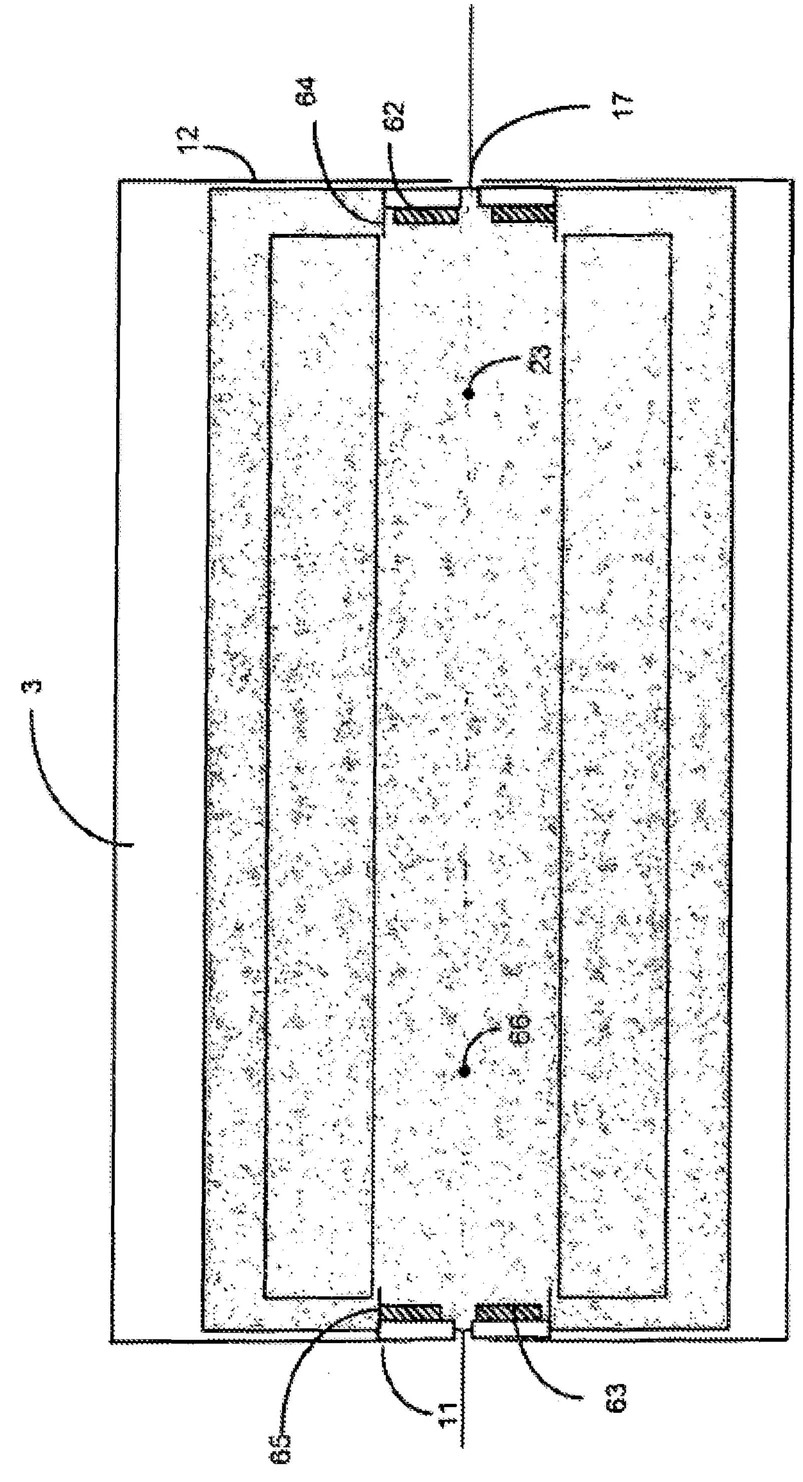
FIG. 4 illustrates an RF multipole collision cell arrangement whereby an electron source such as an indirectly heated cathode dispenser is embedded in the exit and entrance lenses of an RF multipole collision cell.

Another preferred embodiment, as illustrated in FIG. 4, comprises electron sources 62 and 63 positioned within RF multipole collision cell 3. In this preferred embodiment electron sources 62 and 63 are positioned close to the lens 12 and lens 11, respectively, of RF multipole collision cell 3. A spray of electrons is injected toward centerline 17. Voltages are arranged on lenses 11, 12, 64 and 65, bias voltage 15, and on the casing of electrons sources 62 and 63, such that low-energy electrons are focused onto centerline 17 and undergo velocity reversal near points 23 and 66.

Figure 5:
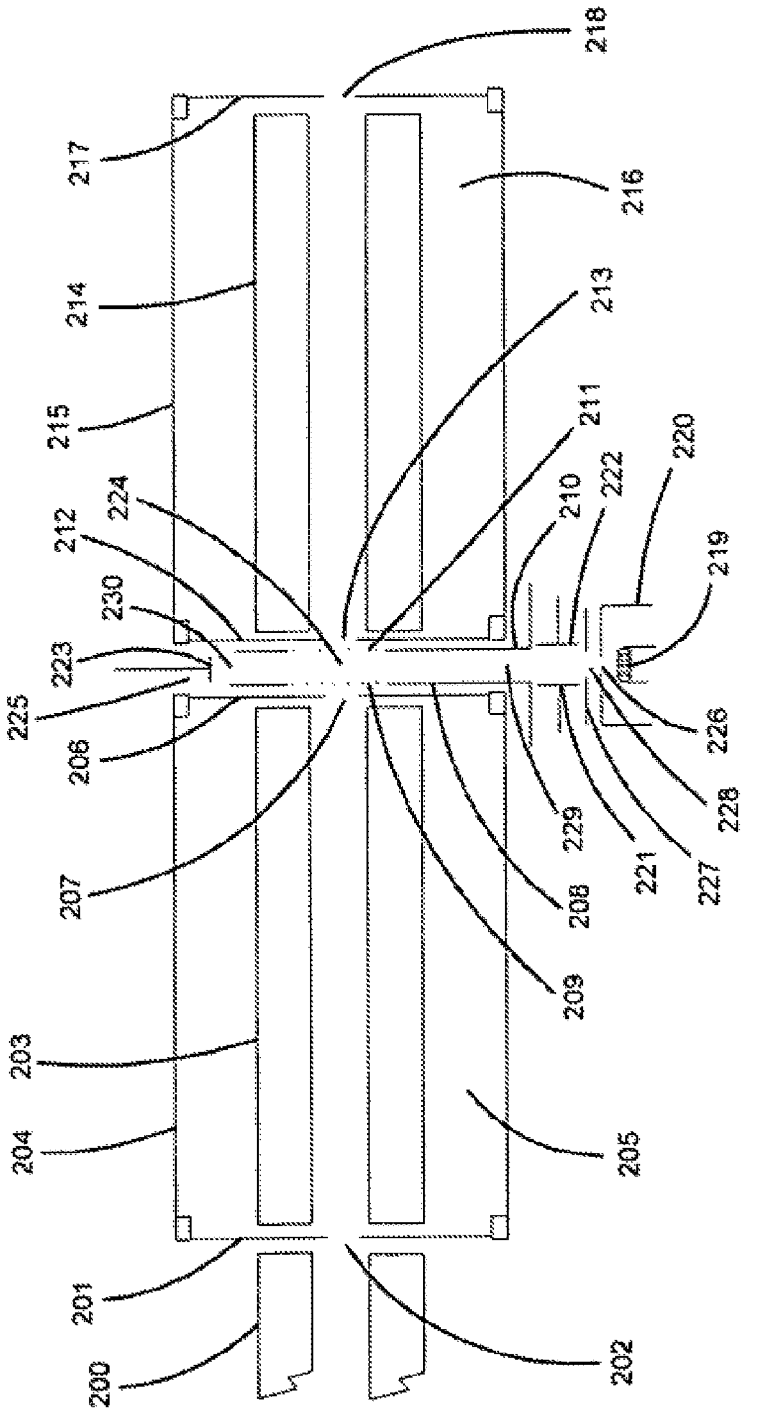
FIG. 5 illustrates two RF multipole collision cells separated by a field free region whereby a low-energy electron beam is produced orthogonal to the axis and intersected with the ion beam at an angle of 90 degrees.

FIG. 5 illustrates still another embodiment of the invention. In this preferred embodiment, two RF multipole ion guides 203 and 214 are positioned so that ions exiting ion guide 203 move in the direction toward the entrance of ion guide 214, and will cross gap 225 accordingly. Ion guide 203 is an integral component of collision cell 205, which comprises enclosure 204, entrance electrode 201 with entrance aperture 202, exit electrode 206 with exit aperture 207, as well as multipole ion guide 203. The gas pressure within collision cell 205 may be adjusted by leaking in gas from an external gas source (not shown) through a valve (not shown) connected to a gas inlet (not shown) to the enclosure 204.

Assembly 216 comprises enclosure 215, entrance electrode 212 with entrance aperture 213, exit electrode 217 with exit aperture 218, and multipole ion guide 214. Assembly 216 may or may not be utilized as a collision cell. When assembly 216 is used as a collision cell, the gas pressure within assembly 216 may be adjusted independently from the adjustment of the gas pressure of collision cell 205, by leaking in gas from an external gas source (not shown) through a valve (not shown) connected to a gas inlet (not shown) to the enclosure 215.

Also shown schematically in FIG. 5 is RF/DC quadrupole mass filter assembly 200. The exit of mass filter 200, which is typically a so-called Brubaker lens assembly comprising a short RF-only section following the actual mass filter assembly, is positioned immediately adjacent to the entrance aperture 202 of entrance electrode 201 of collision cell 205. Precursor ions that are m/z-selected in mass filter 200 are accelerated (gently, so as to avoid CAD) through aperture 202 and enter ion guide 203, which is operated as in RF-only mode for transmitting a wide range of m/z values. Due to low-energy collisions with background gas as the ions traverse ion guide 203, the ions lose kinetic energy and, by the time the ions reach exit aperture 207, the thermal energy of the ions is typically equilibrated to the temperature of the background gas.

Typically, in order to maximize the transport efficiency of ions through the exit aperture, ions are accelerated on their approach to exit aperture 207 due to potential difference between the DC offset bias of ion guide 203 and the voltage of exit electrode 206. However, in order to optimize the process of ECD in region 224, the kinetic energy of the ions needs to be reduced following this extraction acceleration. For this purpose, the ions are then decelerated as they pass through exit aperture 207 toward opening 209 in electrode 208 due to a retarding field between electrode 206 and electrode 208 established by their different applied voltages.

The kinetic energy of the ions will have been reduced to a relatively low level by the time they pass through opening 209. Opening 209 may be a simple aperture, or may comprise a highly transparent mesh (e.g., a 70 line/inch mesh with 90% transparency is available commercially from Buckbee-Meers Corporation), as depicted in FIG. 5, in order to maintain region 224 field-free. As described below, a beam of low-energy electrons is provided in region 224 as well. The precursor ions and low-energy electrons overlap and interact in region 224, resulting in fragmentation of precursor ions via ECD. The resulting product ions, as well as any remaining precursor ions, continue through field-free region 224 and pass through opening 211 in electrode 210. They are then accelerated by an electric field due to a difference in the voltages applied to electrodes 210 and 212, and continue through aperture 213 into the entrance region of ion guide 214.

Ion guide 214 may be an RF/DC mass filter, which may be used for m/z analysis of the precursor and product ion m/z distribution. In this case, a detector that produces a signal in response to a flux of ions exiting through aperture 218 in exit electrode 217 would be located proximal to the ion beam exit side of aperture 218. A record of this signal as a function of the m/z value of the ions transmitted by the mass filter would constitute the measured product ion spectrum (along with any remaining precursor ions.

However, the assembly 216 may also be used as a collision cell. In this case, target gas would be admitted into enclosure 215 to the desired pressure, ion guide 214 would be operated in RF-only mode, and the ions would experience collisional cooling as described above. The ions exit ion guide 214 via exit aperture 218 in exit electrode 217, and, having a reduced kinetic energy and energy spread due to collisional cooling, may be optimally focused into a subsequent m/z analyzer, such as another RF quadrupole mass filter, a TOF-MS, etc., for analysis of the ECD product ion m/z distribution.

Turning now to the production of the beam of low-energy electrons, electrons are produced by electron emitter 219, which is shown schematically in FIG. 5 as a filament, but could also be any of a number of well-known electron emitters, all of which are within the scope of the present invention. Electrons emitted by electron emitter 219 are accelerated through emission aperture 226 in Wehnelt electrode 220 due to the potential difference between the electron emitter 219 and extraction electrode 227. The voltage applied to the Wehnelt electrode 220 may be positive or negative with respect to the bias voltage of the emitter 219, as needed, to properly regulate the electron emission current. The electrons are then focused into a beam and steered by electric fields established by voltages on electrodes 221, 222, 208, and 210, as is well-known to those skilled in the art. As the electrons travel from emitter 219 to the region 229 enclosed by electrodes 208 and 210, the electrons are first accelerated to a relatively high energy, i.e., at least a few tens of electron-Volts (eV) in order to attain maximum electron transport efficiency. However, the electron energy ultimately needs to be reduced to the energies required for performing ECD, i.e., from about 0.2 eV upwards of 5 eV or so. Thus, the electrons are decelerated to their final low kinetic energy upon reaching the essentially field-free region 229 enclosed by electrodes 208 and 210. The kinetic energy of the electrons upon reaching the field-free region 229 is determined by the potential difference between the potential at region 229, as defined primarily by the voltages applied to electrodes 208 and 210, and the bias voltage applied to the emitter 219. The space enclosed by electrodes 208 and 210 extending from region 229 to region 224 and beyond is maintained field-free to ensure that no additional external forces act to divert the low-energy electrons from the path between region 229 and region 224. Region 224 is the region where ECD of precursor ions will occur. A small differential between the voltage applied to electrode 208 and the voltage applied to electrode 210 may sometimes be beneficial in optimizing the overlap between the electron distribution and the precursor ion distribution. Electrons that do not interact in region 224 continue on to region 230. Region 230 is located near electrode 223 which has a voltage applied that is slightly negative with respect to the electron emitter bias. Therefore, electrons reaching the vicinity of electrode 223 will not quite have enough kinetic energy to surmount the potential barrier that this slightly negative potential represents for these electrons. Thus, they will reverse their trajectories, and, if not lost to the surfaces of surrounding electrodes due to field de-focusing effects, will return to region 224, where they will again have the opportunity to interact with precursor ions.

The nominally field-free beam path from region 229 to region 224 ensures that many low-energy electrons reach region 224 successfully. Nevertheless, the transport efficiency for electrons of such low energy is reduced by a number of effects that are difficult to control, such as space-charge broadening in the electron beam, local charging of surfaces along the beam path, residual magnetic fields, as well as the earth's magnetic field, etc. Therefore, a number of improvements over the embodiment sketched in FIG. 5 are envisioned, all being within the scope of the present invention. One such improvement would be to arrange the beam forming and transport electrodes, and the voltages applied to them, along the electron beam path from the emitter to immediately before region 224, such that the kinetic energy of the electrons in the beam remained high until just arriving at region 224, at which point they are rapidly decelerated to their final low energy immediately upon arriving at region 224. This may easily be accomplished by the addition of grids that separate the two regions of different potential, according to methods that are known to those skilled in the art.

Another improvement is the addition of a relative weak magnetic field (a few hundred gauss or so) arranged so the magnetic field lines are more-or-less along the electron beam path and extend from the electron emitter to at least the axis of the collision cell. This is a well-known approach often used in the design of electron-impact ion sources for enhancing electron transport efficiency, since electrons of low energy tend to follow such magnetic field lines in spite of the presence of mild electric fields. Such a weak magnetic field is expected to have negligible effect on the transport of ions in region 224 due to their much larger m/z value and much lower velocity.

Still another enhancement of the electron transport efficiency from region 229 to region 224 is to arrange the voltage differential between the electron emitter 219 and the field free region 229 such that the electron kinetic energy at region 229 is still relatively high. The kinetic energy of the electrons may be reduced substantially by maintaining the volume enclosed by electrodes 208 and 210 at a relatively high gas pressure, so that collisions between the energetic electrons and background gas molecules result in sufficient kinetic energy by the time they arrive at the region 224. For this purpose, the volume that includes regions 229, 224, and 230 may be more completely enclosed than is indicated in FIG. 5, which would result in elevated gas pressure due to gas flowing from the collision cells through orifices 207 and 213. Additionally, a separate gas source may be configured to elevate the gas pressure in this volume.

Even one more additional enhancement to the arrangement depicted in FIG. 5 is to position the electron source and associated electron beam transport optics as close to region 224 as possible. This enhancement may be realized in a straightforward fashion by configuring enclosures 204 and 215 to include a re-entrant cavity or recess wide enough and deep enough to accommodate electron source 219 and associated beam formation and transport electrodes 220, 227, 221, and 222, within the recess. This has the effect of reducing the distance over which the low-energy electron beam must traverse before arriving at region 224, resulting in a greater low-energy electron transmission efficiency.

The relatively high efficiency that is expected from this arrangement stems from the combination of a number of unique and novel features: 1) the substantial reduction in ion kinetic energy due to the previous collisional cooling results in a longer interaction time with low-energy electrons; 2) the establishment of an interaction region that is free of electric fields results in longer residence times for both low-energy electrons and ions, and allows mutual Coulomb attraction forces to be more significant in increasing the frequency and effectiveness of interactions between the ions and electrons; 3) the establishment of an interaction region in close proximity to the exit region of the collision cell implies that cooled precursor ions have very little time to disperse due to space charge effects once they leave the confining action of the RF fields of the collision cell, resulting in a greater probability of interaction with low-energy electrons; 4) in case a magnetic field aligned with the electron beam is used to prevent distortion and dispersion of the low-energy electrons before they arrive at the ion-electron interaction region 224, more electrons arriving at this region results in greater interaction efficiency.

The collision cells 205 and/or 216 of the embodiment illustrated in FIG. 5 may also be operated in trapping mode. In this way, the ions are provided sufficient time to collide with the collision gas and cool to the temperature of the target gas before reaction. The RF multipole collision cell 216 may be pressurized by addition of the same or different collision gas as the first RF multipole collision cell 205. Fragment ions in RF multipole collision cell 216 can continue their migration through collision cell 216, or they may be trapped, cooled and/or even further fragmented, before being released for m/z analysis.

Figure 6A:
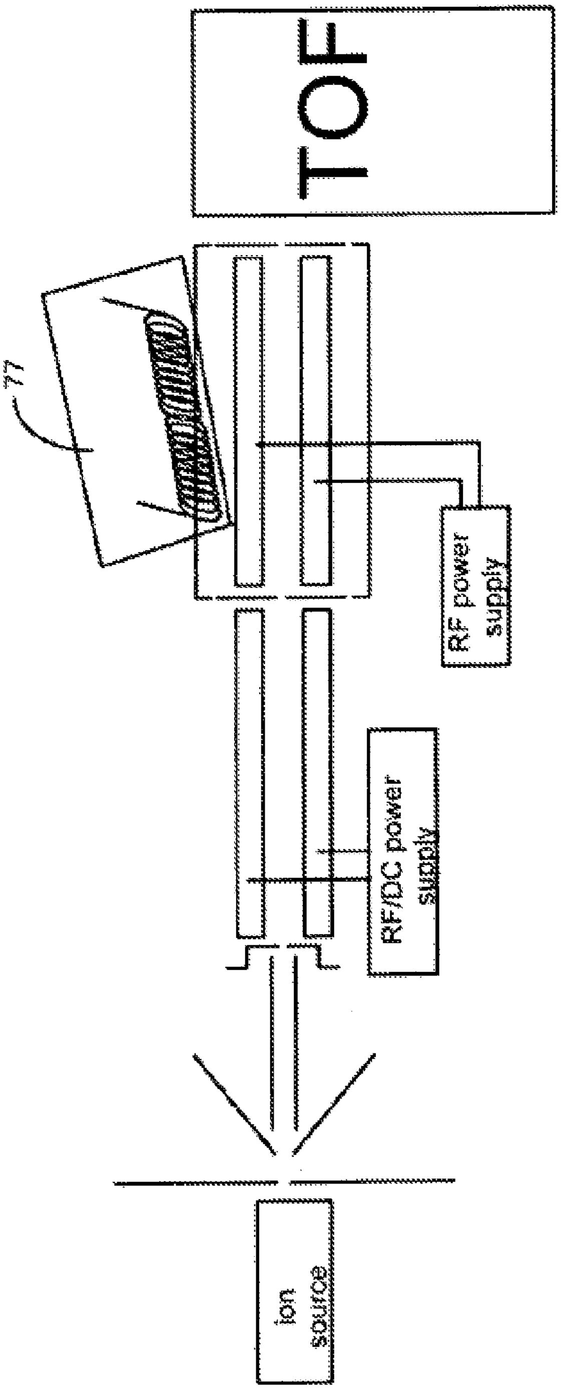
FIG. 6A illustrates an RF multipole collision cell configuration wherein an electron beam source is mounted in the space above a pair of oppositely charge rods, and electrons are injected through the elongated space between the rods.
Figure 6B:
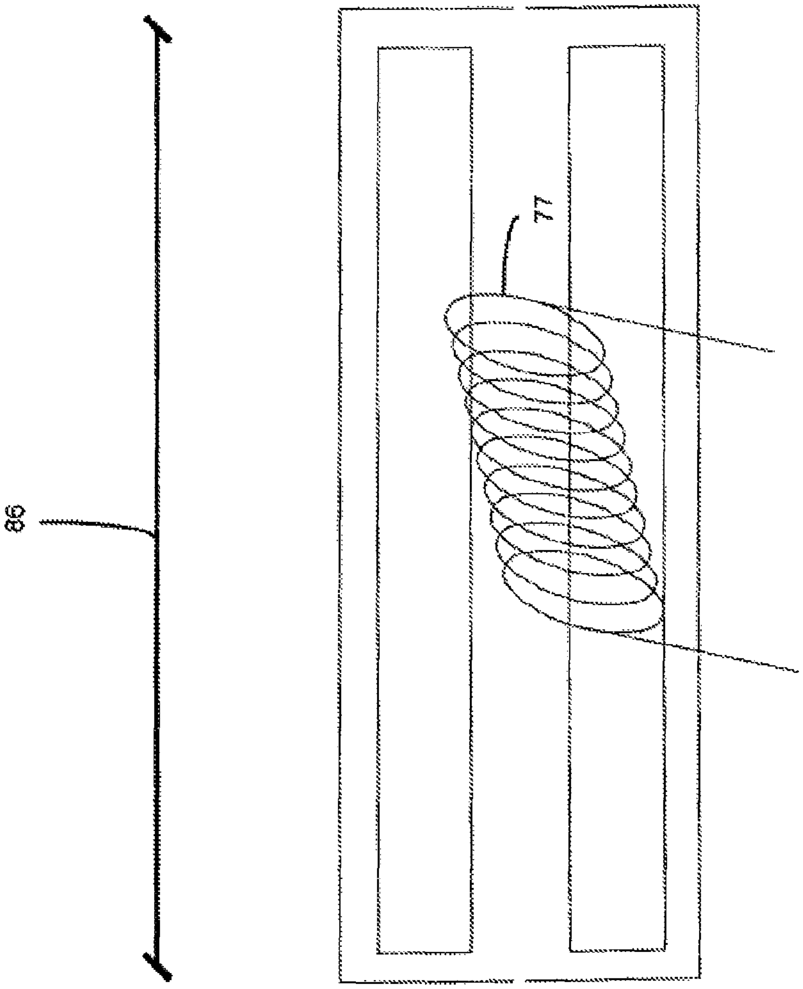
FIG. 6B illustrates a top-down view of the electron source configuration.
Figure 6C:
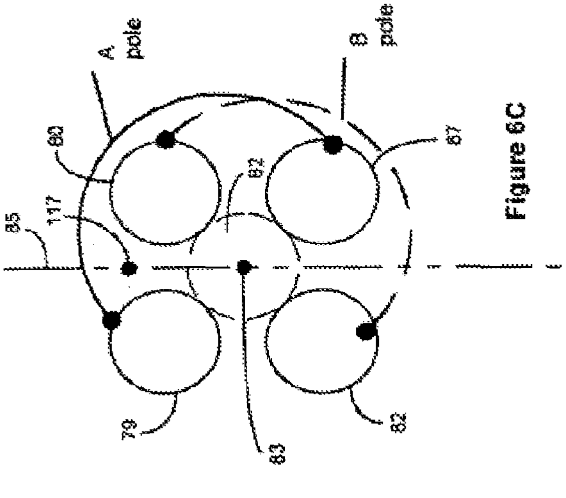
FIG. 6C illustrates the four-pole configuration of an RF quadrupole collision cell.
Figure 6D:
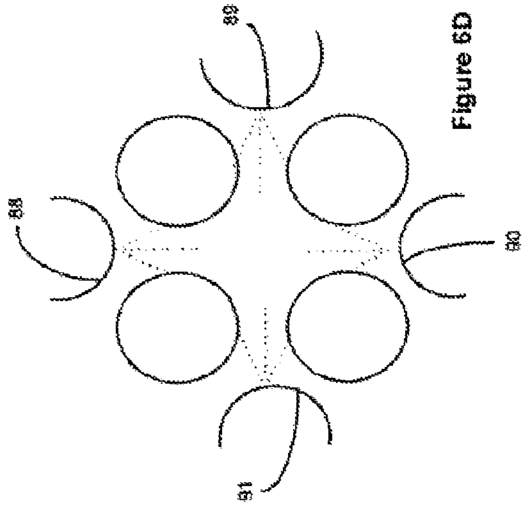
FIG. 6D illustrates the electron beam source configuration of FIG. 4*a* with four filaments.
Figure 6E:
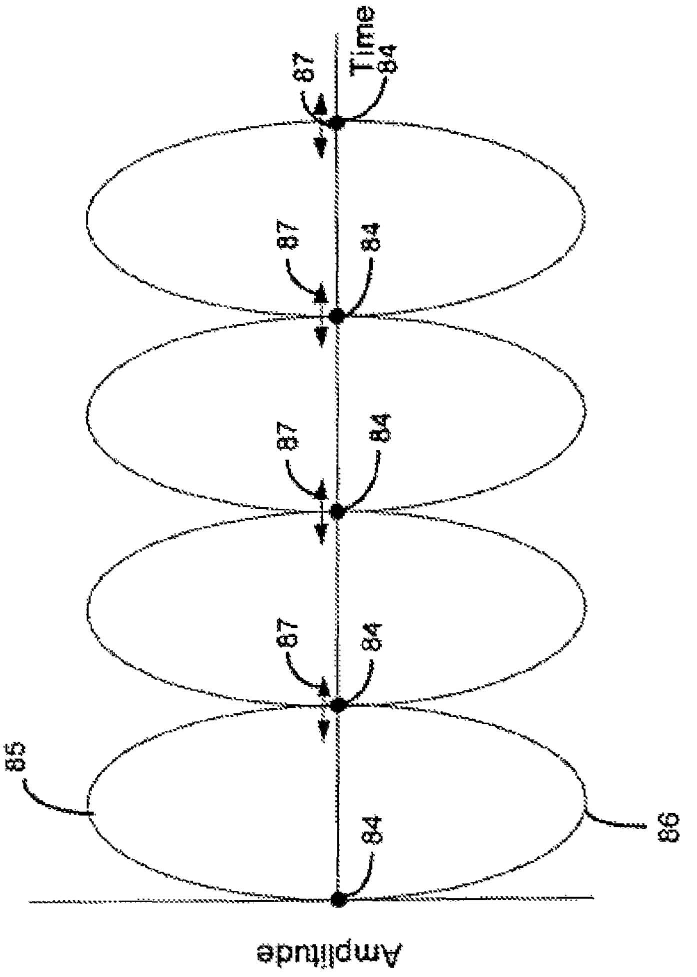
FIG. 6E illustrates the oscillating nature of the electric fields between the rods.

Another preferred embodiment is illustrated in FIGS. 6A through 6E, and comprises the introduction of an electron beam between the electrode structures of an RF multipole collision cell, with the electron source positioned above and/or between the poles of the electrode structure. Ions are generated, transported and mass-selected conventionally as described above. Electron source 77 is configured to provide emission along the length of the electrodes. Electrons are injected in the space between the rods, and along the length of the rods, as illustrated in FIGS. 6A and 6B. In this schematic representation, an RF quadrupole ion guide is utilized, as shown in FIGS. 6C and 6D, although, again, an RF ion guide with a different number of rods could be used as well. The collision cell quadrupole consists of 4 rods 78, 79, 80 and 81 (round or hyperbolic) mounted coaxial with a circumscribed radius 82, as illustrated in FIG. 6C. One set of opposite pairs of rods 79 and 81 is connected together to form the A pole and the other set of rods 78 and 80 is connected to form the B pole. As usual, an RF voltage is applied to each pole with a 180-degree phase shift producing a quadrupolar field. The potential at point 83 in the center of the rods is adjusted to be close to zero, (assuming the DC reference voltage is zero). The RF voltage alternates from Vp to 0 to −Vp and back again, on the A pole, and from −Vp to 0 to Vp, and back again, on the B pole. Consider the electric field at point 117 between rod 79 and rod 80. At some points in time, when the RF voltage on rod 79 is attractive with respect to the electron source 77 in FIG. 6B, the electrons strike the rod 79. At other points in time, when the RF voltage on rod 80 is attractive with respect to the electron source, the electrons strike rod 80. When the voltages on the poles are close to or at zero, the electric field at point 117 is also close to or near zero. These nodes are illustrated at points 84 on curves 85 and 86 in FIG. 6D, which plots RF voltage vs. time for the A and B pole, respectively. Voltages on electron source 77 can be configured such that at times near points 84, low-energy electrons traverse centerline 85 in FIG. 6C. Typical RF frequencies are in the range of 250 kHz to 2 MHZ. For example for a 250 kHz frequency, the voltage repeats its cycle every 4 us, and achieves a field-free or nearly field-free region within the ion guide volume every 2 us. Lines 87 on FIG. 6D illustrate the window of time δt for which electrons can pass through the rods and traverse centerline 85. A sinusoidal field is given by $V_o\sin(\Omega t)$ and the rate of change of the voltage is $-\Omega V_o\cos(\Omega t)$. The duty cycle in the case of a 250 kHz frequency is δt/2 us. It is possible to optimize St by adjustment of maximum RF voltage (effectively adjusting the Mathieu q-parameter), and to permit a spread in electron energy of several volts. Duty cycles on the order of 1-2% are achievable. Although the duty cycle is small, the injection volume can be very large since electrons can be injected over the length of the electrodes, illustrated by line 86 in FIG. 6B. FIG. 6E illustrates utilizing four electron sources 88, 89, 90 and 91 to further enhance the injection efficiency. As discussed in a previous embodiment, it is possible to pulse the RF frequency off and on for a short duration of time to enhance the electron injection efficiency.

Figure 7A:
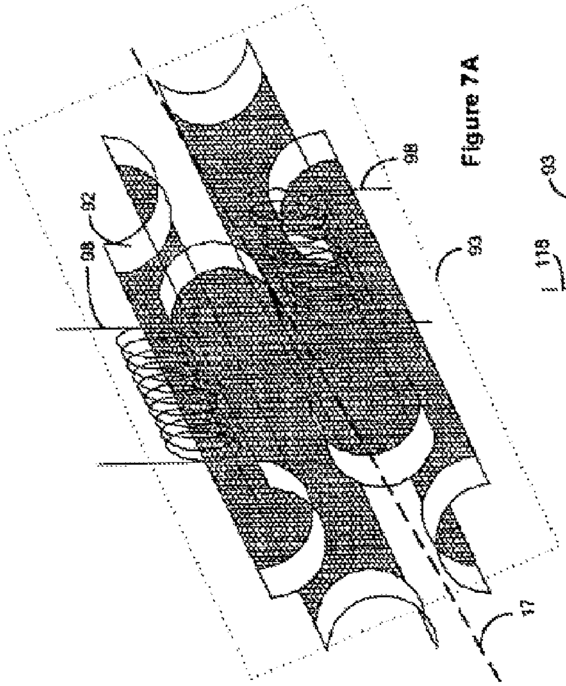
FIG. 7A illustrates a multipole array constructed from mesh wire, through which electrons are injected.
Figure 7B:
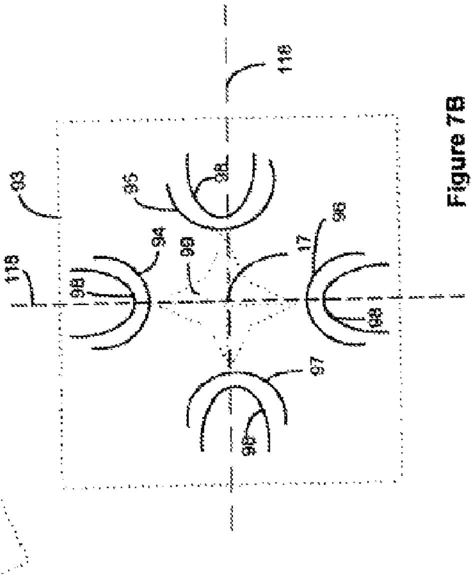
FIG. 7B illustrates from another angle a multipole array constructed from mesh wire, through which electrons are injected.

Another preferred embodiment of the invention comprises a multipole rod structure constructed of semi-transparent thin wires or meshed conducting materials 92. This is illustrated in FIGS. 7A and 7B. The mesh assembly 93 comprises 4 electrodes, 94,95,96 and 97. As above, opposite pairs of electrodes are electrically connected to form the pairs A pole and B pole. Electron source 98 is positioned within the mesh rods. The alternating nature of the RF voltage is utilized for introduction of the electron beam into the RF collision cell. The potential difference between the voltage on electron source 98 and the potential surface near centerline 17 determines the kinetic energy of the electron as it traverses inward, toward centerline 17. The voltages applied to the poles determine the potential surface near centerline 17. It is possible to arrange voltages to reduce the velocity of the electron as it traverses along axes 118 toward centerline 17, or to configure the potential surface such that there are velocity reversals near centerline 17. For example, for one length of time, electron source 98 is positioned behind an electrode with a negative polarity. Outside the electrode surface near point 99 in FIG. 7B, the potential rapidly changes from the negative value at the electrode surface, to close to zero at the centerline. This generates an attractive field for electrons. Voltages on electron source 98 can be configured such that electrons exit through the mesh and accelerate toward centerline 17. Slow electrons will be available when the electrode voltage nears zero. Similarly, at another point in time, the electrode has a positive polarity. Outside the electrode surface near point 99 in FIG. 7B, the potential rapidly changes from the positive value at the electrode surface, to close to zero at the centerline. This field is repulsive to the electrons, and they decelerate as they move toward centerline 17. The voltages of electron source 98 are adjusted differently for the two cases, and also take into account the DC bias voltage 15 on RF multipole collision cell 3 from FIG. 1, to maximize the density of low-energy electrons near centerline 17. Similarly, the balance of the electrode pairs can be adjusted using capacitance device 16 of FIG. 1 to optimize the electric fields near centerline 17.

Figure 8A:
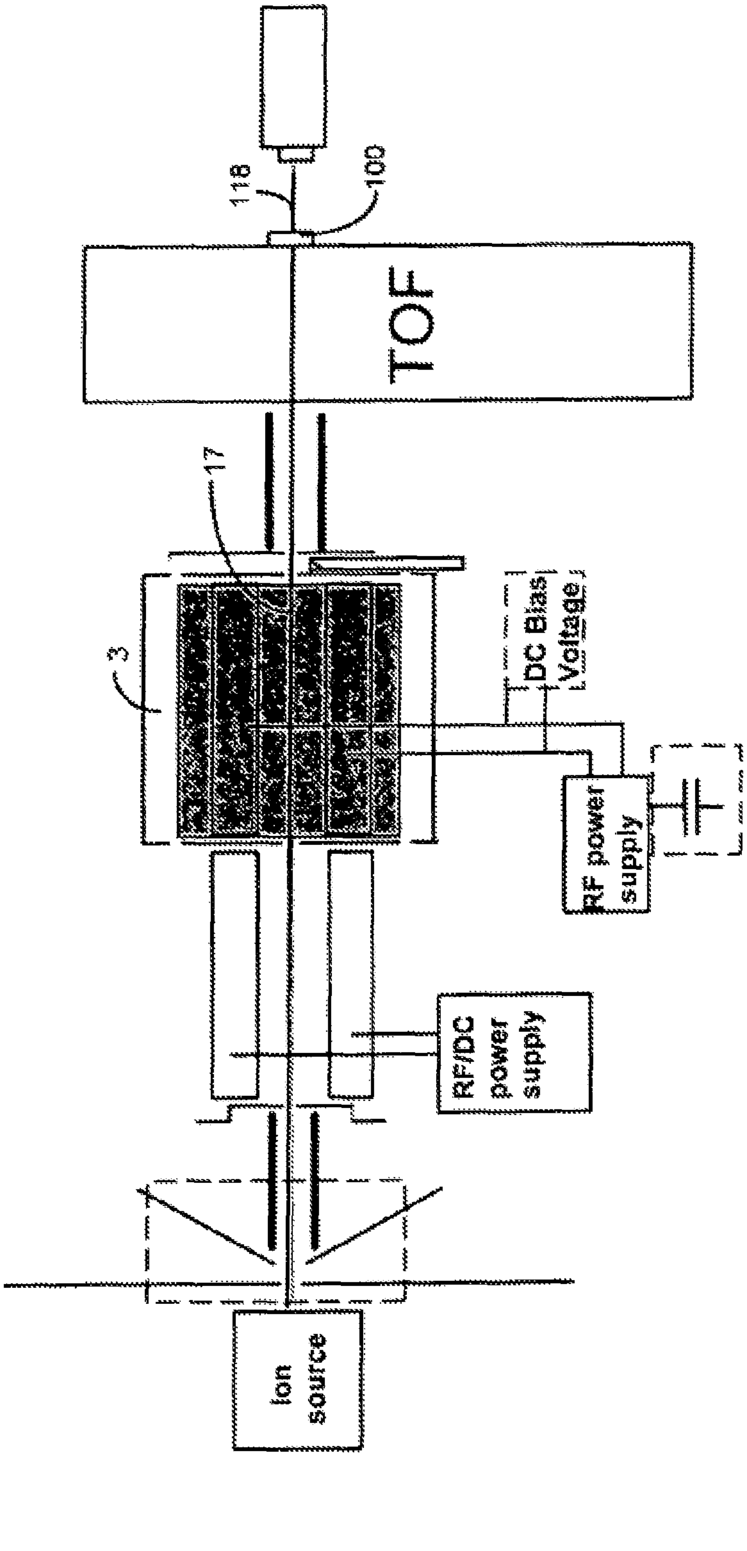
FIG. 8A illustrates the use of a laser, transmitted through an RF multipole collision cell in a coaxial configuration, used to resonantly ionize molecules to generate slow electrons.
Figure 8B:
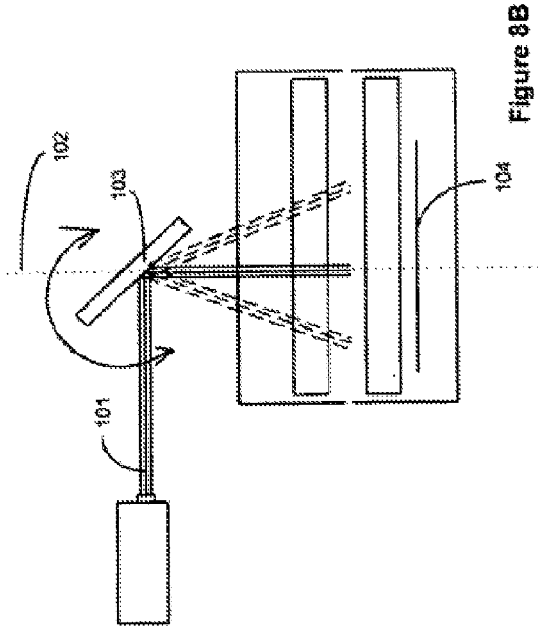
FIG. 8B illustrates the use of a laser, transmitted through an RF multipole collision cell in an orthogonal configuration, used to resonantly ionize molecules to generate slow electrons.
Figure 8C:
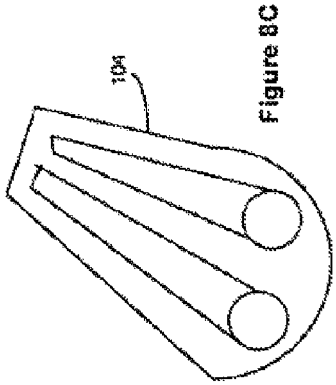
FIG. 8C is a representation of a mirror arrangement that can be used to aid multi-passing.

Another embodiment of the invention comprises an RF multipole collision cells and a light source such as an ultraviolet (UV) laser to induce resonant ionization of molecules, generating low-energy electrons. Two configurations are illustrated in FIGS. 8A, 8B and 8C. An ultraviolet light source is tuned to the transition of a dopant molecule in the collision cell. This molecule may be Nitrogen gas, which is plentiful and which has a high cross section for resonant multiphoton ionization. One photon is tuned to excite an electronically excited state. The second photon induces ionization from that excited state. Typically, low-energy electrons can be ejected in this manner. The highest yield occurs when laser beam overlaps the ion beam on centerline 17. FIG. 8A illustrates a configuration whereby laser beam 118 is introduced to the mass spectrometer through a high transmission window 100 at one end of the mass spectrometer. The laser beam is focused on centerline 17 and transported into RF multipole collision cell 3 through several orifices. Laser beam 118 ionizes gas phase molecules along centerline 17 within RF multipole collision cell 3. FIG. 8B illustrates an alternative approach whereby the laser beam 101 is introduced to the RF multipole collision cell 3 orthogonal to centerline 17, through the space between the adjacent poles of RF multipole collision cell 3. Laser beam 101 is swept along axis 102 by means of a rotating a mirror 103. An additional mirror 104 can be positioned below the ion guide to permit multiple passing of laser beam 101 as illustrated in FIG. 8C.

Figure 9A:
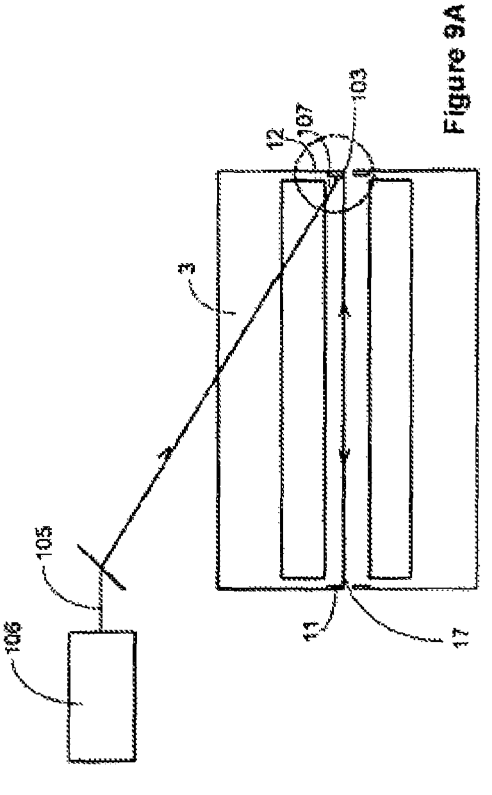
FIG. 9A illustrates a RF multipole collision cell arrangement whereby a photosensitive material is embedded in an exit lens, and a laser is used to induce electron emission.
Figure 9B:
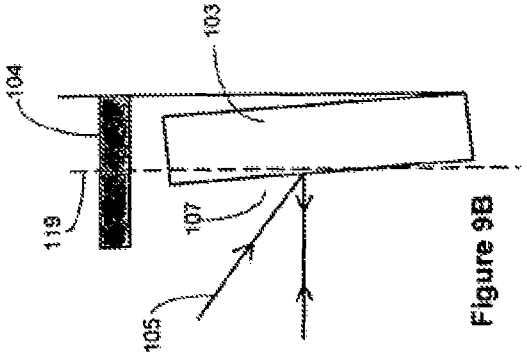
FIG. 9B illustrates an enlarged view of the electron source.
Figure 9C:
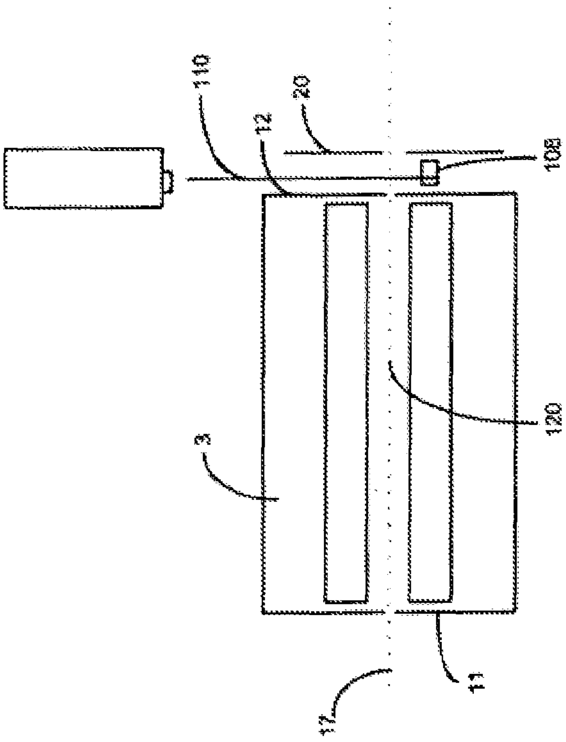
FIG. 9C illustrates a similar arrangement whereby the photosensitive material is positioned at right angles to the ion axis.

Another embodiment of the invention is illustrated in FIGS. 9A, 9B, and 9C, and comprises a light source or a laser to induce electron emission from a photosensitive surface. The light source may be oriented as shown in FIGS. 9A and 9B. Alternatively, it may be introduced at an angle to the RF multipole collision cell 3. This is illustrated in FIG. 9C. Photosensitive surface 103 is embedded in lens 11 and 12 of RF multipole collision cell 3. Focusing lens 104 aids in directing electrons toward centerline 17. The photosensitive material is fabricated to provide a high yield of electron emission when impinged upon by high-energy ions or photons or electrons and may be obtained commercially and fabricated for this application. Laser beam 105 from laser source 106 is introduced at an angle 107 with respect to axis 119, striking surface 103, as illustrated in FIG. 9B. Some fraction of photons are absorbed, causing an electronic transition within the material to occur. An electron is ejected whose energy is approximately equal to the photon energy minus the energy of the state that absorbed the photon. The system is configured to permit multiple passes of laser beam 105 by reflecting it off surface 103 positioned at an angle 107. An alternative configuration utilizing a photosensitive surface placed orthogonal to centerline 17 is illustrated in FIG. 9C. This configuration is similar to those outlined above. Photosensitive surface 108 is mounted below centerline 17 in the space between lens 12 and lens 20. Laser beam 110 impinges directly on photosensitive surface 108. As previously described, ions can be trapped in RF multipole collision cell 3. Voltages are arranged on lenses, including lens 12, 20, surface 108, RF multipole collision cell 3, DC bias voltage 15, and lens 11, to direct low-energy electrons onto centerline 17 and to induce electron velocity reversal near point 120.

An alternative configuration of the above-mentioned embodiment includes a similarly configured surface that emits electrons when struck by high-energy ions, or high-energy electrons. In this configuration, high-energy ions with several kV (or more) can be introduced externally by acceleration of an ion generated by the ion source, for example oxygen ions. High-energy electrons may be produced by any of the high-energy electron sources well-known by those skilled in the art. The high-energy ions (or electrons) readily overcome the low voltage trapping barriers. They enter RF multipole collision cell 3 with a sufficient divergence to strike the surface and emit low-energy electrons due to inelastic scattering processes within the surfaces.

Figure 10:
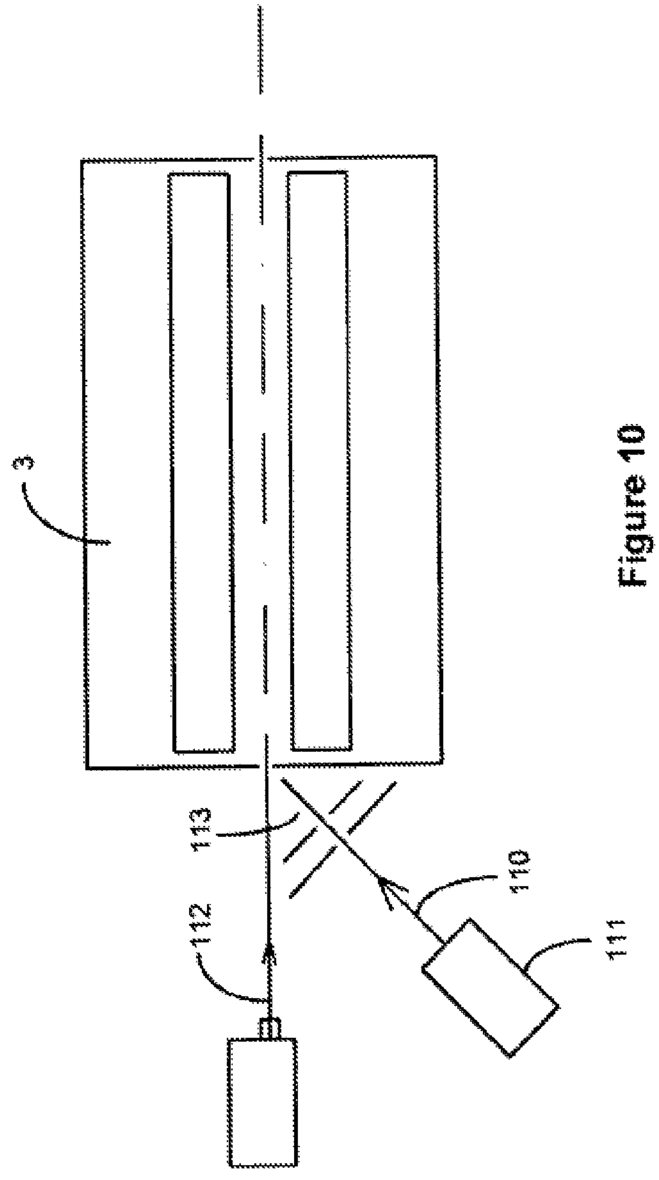
FIG. 10 illustrates an RF multipole collision cell arrangement whereby the electron beam and primary ion beam are injected into the collision cell at a relative angle greater than zero degrees and less than 90 degrees.

Another embodiment is illustrated in FIG. 10. This embodiment comprises the injection of an ion beam 110 from ion source 111 into RF multipole collision cell 3 and the simultaneous injection of electron beam 112 into the volume, at angle 113 between 0 and 90 degrees. Ion beam 110 is generated by normal means, i.e., utilization of ion source 1 in transport region 6 and RF multipole ion guide 7 and mass analyzer 2 in FIG. 1. These ions can then be mildly accelerated and injected into RF multipole collision cell 3 at angle 113. In this configuration, the RF field is set at sufficiently high q to capture a large fraction of the ions, after which point they are trapped. Low energy electron beam 112 is injected coaxial to RF multipole collision cell 3.

Figure 11A:
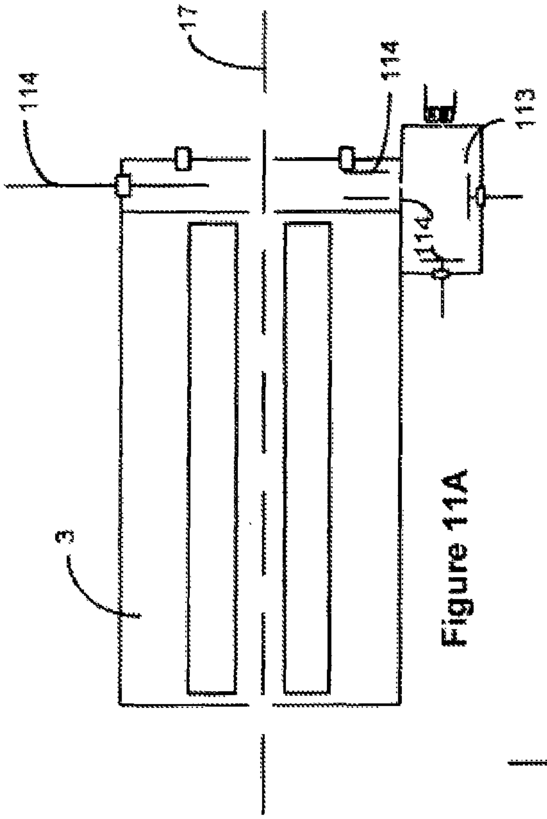
FIG. 11A illustrates an ion source suitable for ion-ion interactions, and injected inward toward the centerline of an single RF multipole collision cell.

In another preferred embodiment, ions of opposite polarity to the precursor ions are injected into RF multipole collision cell 3 in order to induce fragmentation. FIG. 11A illustrates the configurations whereby an orthogonal injection source is coupled to RF multipole collision cell 3. Ions are produced in source region 113 rather than electrons. For example, negative ions are chemically produced in source region 113 by means of chemical reactions. The ions are directed upward toward centerline 17 using optics configuration 114. Precursor ions may be trapped in RF multipole collision cell 3, as described earlier. Voltages are adjusted to turn the ions into RF multipole collision cell 3 and direct the ions onto centerline 17, as described earlier.

Figure 11B:
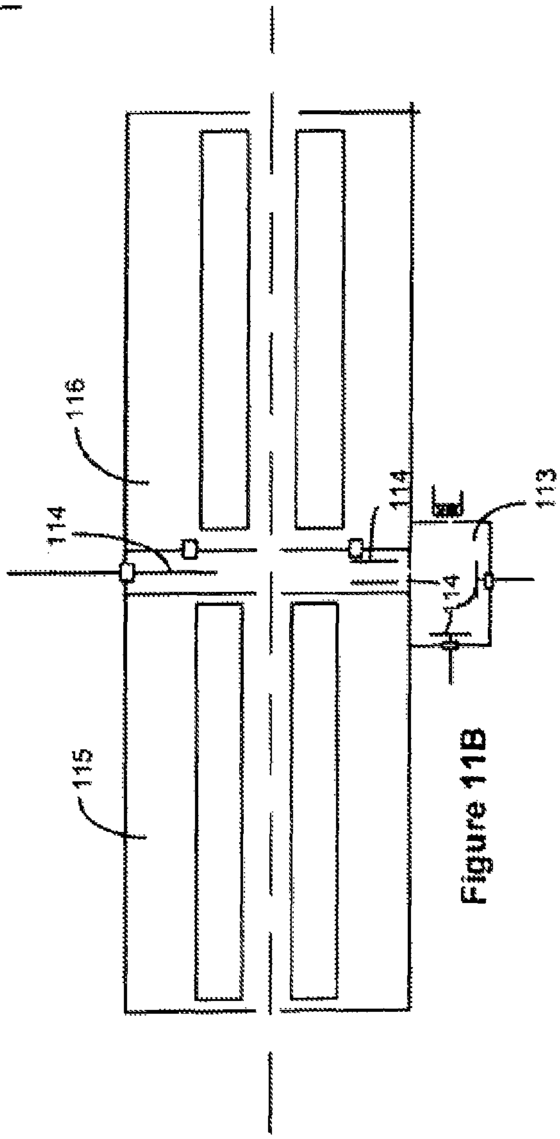
FIG. 11B illustrates an ion source suitable for continuous flow applications, whereby an ion beam is directed into the space between two RF multipole collision cells, and intersects with a precursor beam in a cross-beam fashion.

An alternative embodiment is illustrated in FIG. 11B. The ions of opposite polarity intersect in a cross beam fashion, as the precursor ion flows from RF multipole collision cell 115 to RF multipole collision cell 116. As in FIG. 11A, ions are produced ion source 113, directed toward centerline 17 by use of optics configuration 114. Fragment ions are contained by RF multipole 116, and may undergo further steps of CAD.

Numerous approaches can be undertaken to optimize the electrostatic and magnetic focusing and trapping of the electron beam in RF multipole collision cell 3 and this invention includes but is not limited to those described in the above embodiments. Also it is within the scope of the invention to pulse on and off the magnetic field and the electric field for any above-mentioned embodiment. Usually sinusoidal waveforms are applied to RF multipole ion guides, however it is sometimes preferable to use alternative waveforms for RF including but not limited to square waveforms or triangular waveforms. These alternative waveforms are within the scope of the invention.

All embodiments described above relate to the combination of electrons and ions. All embodiments that utilize electron sources such as cross beam devices are equally applicable to positron sources.

All embodiments provide for a means to adjust the RF balance on the multipole rods. For example, for a quadrupole ion guide, it is important that there is a means to adjust the ratio A/B in order to optimize the yield of electron capture. This is necessary because the RF field on axis needs to be optimized. In most cases no offset is desirable. Nonetheless it is a parameter that needs to be optimized for all configurations and experimental conditions.

All embodiments described above relate to the combination of electrons and ions in an RF multipole ion guide. The volume may be pressurized, for example as in an RF multipole collision cell. The pressure range is typically near 1 mTorr but can range from 0.01 mTorr to 200 mTorr. In many cases, a multipole collision cell consists of a set of rods that are encased by some enclosure. This permits containment of gases within the RF multipole ion guide. However, it is within the scope of this invention to utilize the embodiments in a high-pressure RF multipole ion guide that is not specifically enclosed. In these instances the RF multipole ion guide may reside in a pressurized vacuum chamber, and it may be positioned contiguous to other ion guides residing in the same pressurized region. These other ion guides may serve as mass analyzers, collision cells, or transporter guides.

Combinations of the embodiments of the present invention are within the scope of this invention. Also, the placement of electron sources at multiple locations using multiple configurations is within the scope of the invention. For example, an electron source may be positioned at the entrance and exit of the multipole ion guide simultaneously with the space between the A and B of an RF quadrupole collision cell, both directed toward the axis, and is also included within the scope of the invention.

Combinations of RF multipole ion guides and collision cells are within the scope of the invention. For example, in some cases it is preferable to first set conditions for CAD and then perform electron capture. For example a single collision cell can be used to permit simultaneous performance of CAD and ECD. Alternatively, multiple collision cells can be used to permit conventional low energy CAD and ECD to be performed one after the other (in sequence).

Combinations of the embodiments described above in conjunction with other mass spectrometers such as three-dimensional ion traps are within the scope of this invention. For example a three-dimensional ion trap may be placed in series with the embodiments of this invention.

As stated above, the electron source is suitable for operation in the mTorr range and can include but is not limited to a heated filament; an indirectly heated cathode dispenser; photosensitive materials in combination with a photon source; a commercially obtained electron gun; and so on. As shown above, the electron source may be configured close to the axis of the RF multipole collision cell or RF multipole ion guide, or displaced from the axis with appropriate use of electron transfer optics. The electron sources are configured to give a range of energy from 0.2 to 10 eV with reference to the axis of the multipole RF collision cell or ion guide.

The embodiments as stated above require optimization of all the electrode voltages within the electron source, RF multipole collision cells, and RF multipole ion guides. The electric fields are determined in part by the relative sizes of the structures and therefore it is within the scope of this invention to include rod diameters, lengths, circumscribed diameters and configurations of a variety of sizes and poles numbers.

Having described this invention with regard to specific embodiments, it is to be understood that the description is not meant as a limitation since further modifications and variations may be apparent or may suggest themselves to those skilled in the art. It is intended that the present application cover all such modifications and variations as fall within the scope of the appended claims.

The invention claimed is:

1. An apparatus for fragmenting ions of sample substances, comprising:

(a) a first multipole ion guide comprising a set of rods parallel to each other and spaced about an ion guide axis, the first multipole ion guide having an entrance end and an exit end;

(b) an electron source arranged downstream of the entrance end of the first multipole ion guide, the electron source configured to produce low-energy electrons;

(c) a first enclosure arranged upstream of the entrance end of the first multipole ion guide, the first enclosure enclosing a second multipole ion guide, the second multipole ion guide having an entrance end and an exit end; and (d) one or more lenses configured to direct low-energy electrons from the electron source to a region proximal to the ion guide axis between the exit end of the second multipole ion guide and the exit end of the first multipole ion guide such that the kinetic energies of the low-energy electrons are less than about 10 eV in the region.

2. The apparatus of claim 1, wherein the first enclosure is at a first pressure and the first multipole ion guide is housed in an evacuated region having a second pressure.

3. The apparatus of claim 2, wherein a length and diameter of the first multipole ion guide is configured to restrict conductance of ions between the first enclosure and the evacuated region.

4. The apparatus of claim 2, wherein the electron source is housed in a second evacuated region having a third pressure.

5. The apparatus of claim 4, wherein the third pressure is lower than the second pressure.

6. The apparatus of claim 1, further comprising a first set of vacuum seals between the entrance end of the first multipole ion guide and the first enclosure.

7. The apparatus of claim 1, wherein the electron source is arranged downstream of the exit end of the first multipole ion guide.

8. The apparatus of claim 1, wherein the first multipole ion guide comprises semi-transparent wires or meshed conducting materials.

9. The apparatus of claim 1, wherein the electron source comprises an element selected from the group consisting of a directly-heated filament, an indirectly-heated cathode, a negative electron affinity surface, a multichannel plate, an electron field-emission array, a surface impacted by a laser beam, and gas molecules excited by a laser source.

10. The apparatus of claim 1 further comprising a device configured to produce an aligned magnetic field so as to guide the electrons from the electron source to the region between the exit end of the second multipole ion guide and the exit end of the first multipole ion guide.

11. A method for fragmenting parent ions, comprising:

(a) providing a first multipole ion guide having an ion guide axis, the first multipole ion guide having an entrance end and an exit end;

(b) providing an electron source downstream of the entrance end of the first multipole ion guide;

(c) providing an enclosure upstream of the entrance end of the first multipole ion guide with a background gas from a controllable gas supply; the enclosure enclosing a second multipole ion guide, the second ion guide having an entrance end and an exit end;

(d) producing thermalized precursor ions in the second multipole ion guide;

(e) directing electrons from the electron source with kinetic energies below 10 electron volts into the first multipole ion guide to a region proximal to the axis;

(f) transporting the thermalized precursor ions from the second multipole ion guide into the first multipole ion guide;

(g) applying AC and DC voltages to electrodes of the first multipole ion guide; and (g) focusing the thermalized precursor ions to the region proximal to the axis, wherein the electrons and the thermalized precursor ions interact to cause fragmentation of at least some of the thermalized precursor ions to produce a population of fragment ions.

12. The method of claim 11, wherein the region proximal to the axis is between the exit end of the second multipole ion guide and the exit end of the first multipole ion guide.

13. The method of claim 11, further comprising adjusting voltages on one or more lenses downstream of the exit end of the first multipole ion guide, the electron source, DC voltage bias on the first multipole ion guide, and DC voltage bias on the second multipole ion guide such that an electron velocity reversal occurs at a first location proximal to the entrance end of the first multipole ion guide.

14. The method of claim 13, wherein a sufficient number of collisions occurs at the first location to contain fragment ions in the first multipole ion guide.

15. The method according to claim 11, wherein the electrons are directed between the electrodes of the multipole ion guide to the region when voltages on the electrodes are close to or at zero.

16. The method according to claim 15, wherein the electrons are guided to the region by a magnetic field.

17. The method according to claim 11, wherein the AC voltages comprises sinusoidal, square or triangular waveforms.

18. The method of claim 11, further comprising adjusting a gas pressure within the enclosure such that collisions between ions and background gas molecules result in a reduction of ion kinetic energy and focusing of said ions closer to said ion guide axis.

19. The method of claim 16 wherein guiding the electrons by a magnetic field comprises applying a magnetic field coaxial with the ion guide axis of the first multipole ion guide.

20. The method of claim 11, wherein directing the electrons to the region comprises directing the electrons between the electrodes of the first multipole ion guide.

* * * * *

UNITED STATES PATENT AND TRADEMARK OFFICE

CERTIFICATE OF CORRECTION

PATENT NO. : 8,686,356 B2
APPLICATION NO. : 13/714089
DATED : April 1, 2014
INVENTOR(S) : Craig M. Whitehouse et al.

It is certified that error appears in the above-identified patent and that said Letters Patent is hereby corrected as shown below:

On the Title Page, Col. 2 Item (56) (Other Publications), line 5, delete "-HfjT5ivF4Y0QGnssDwAw" and insert -- -HfjT5ivF4fY0QGnssDwAw --, On the Title Page, Col. 2 Item (57) (Abstract), line 3, delete "(EGO)" and insert -- (ECD) --, On the Title Page, Col. 2 Item (57) (Abstract), line 4, delete "(PGO)," and insert -- (PCD), --, On the Title Page, Col. 2 Item (57) (Abstract), line 6, delete "EGO" and insert -- ECD --, On the Title Page, Col. 2 Item (57) (Abstract), line 6, delete "PCO)" and insert -- PCD) --, On Title Page 2, Col. 1 Item (56) (Other Publications), line 7, delete "tutorialsei.html." and insert -- tutorials/ei.html. --.

Signed and Sealed this
Fifteenth Day of July, 2014

Michelle K. Lee
*Deputy Director of the United States Patent and Trademark Office*